(12) United States Patent  
Srinivasan et al.

(10) Patent No.: US 7,489,946 B2  
(45) Date of Patent: Feb. 10, 2009

(54) CELLULAR PHONE IN FORM FACTOR OF A CONVENTIONAL AUDIO CASSETTE

(76) Inventors: Sudharshan Srinivasan, 5496 Golubin Common, Fremont, CA (US) 94555; Jai Kumar, 20360 Clifden Way, Cupertino, CA (US) 95014; Kothandraman Ramchandran, 45426 Potawatami Dr., Fremont, CA (US) 94539

( * ) Notice: Subject to any disclaimer, the term of this patent is extended or adjusted under 35 U.S.C. 154(b) by 549 days.

(21) Appl. No.: 11/402,640

(22) Filed: Apr. 12, 2006

(65) Prior Publication Data

US 2006/0234769 A1   Oct. 19, 2006

Related U.S. Application Data

(60) Provisional application No. 60/671,242, filed on Apr. 14, 2005.

(51) Int. Cl.  
*H04M 1/00* (2006.01)

(52) U.S. Cl. .................. 455/556.1; 455/550.1; 455/557; 455/3.06

(58) Field of Classification Search .............. 455/556.1, 455/550.1, 557, 414.1, 3.06, 575, 166.1, 455/344, 345, 346, 90.1, 100, 95

See application file for complete search history.

(56) References Cited

U.S. PATENT DOCUMENTS

| 6,058,298 | A  | * | 5/2000  | Stamegna ............... 455/345 |
| 6,085,078 | A  | * | 7/2000  | Stamegna ............... 455/345 |
| 2003/0224726 | A1 | * | 12/2003 | Shearer et al. ........... 455/41.1 |
| 2005/0245191 | A1 | * | 11/2005 | Falcon .................. 455/3.06 |
| 2005/0266801 | A1 | * | 12/2005 | Mathews ................ 455/66.1 |

\* cited by examiner

*Primary Examiner*—Tan Trinh

(57) ABSTRACT

A hands free cellular phone system combining a full featured cellular phone with a form factor of a conventional audio cassette is provided. Several embodiments enabling real time interactive multimedia applications are also provided. Said hands free cellular phone system comprises a cellular phone device (1) in form factor of a conventional audio cassette (9). Device (1) can be inserted into any conventional audio cassette player (22) to transfer audio content into conventional audio cassette player (22) by using electromagnetic coupling with electromagnetic transducer (28) of said device (1) and electromagnetic transducer of conventional audio cassette player (35). Said device (1) provides a full featured, forward compatible, low installation cost hands free cellular phone system.

44 Claims, 46 Drawing Sheets

CASAPHONE – MID RANGE

PRIOR ART DIAGRAM 1 of 5

CONVENTIONAL AUDIO CASSETTE

PRIOR ART DIAGRAM 3 of 5

CELLULAR WIRELESS NETWORK

PRIOR ART DIAGRAM 4 of 5

BROADCAST NETWORK

PRIOR ART DIAGRAM 5 of 5

MAGNETIC CARD

CELLULAR PHONE IN FORM FACTOR OF A CONVENTIONAL AUDIO CASSETTE

CROSS-REFERENCE TO RELATED APPLICATIONS

This is the patent of U.S. provisional application Ser. No. US 60/671,242, filed Apr. 14, 2005.

BACKGROUND OF THE INVENTION

1. Field of Invention

The present invention generally relates to cellular phones and specifically to hands free models of cellular phones that leverage external peripherals.

2. Prior Art

Cellular phones exist in various form factors and functionalities. The form factor of a device is its linear dimensions and physical configuration. The features of cellular phones may be divided into low end, mid-range and high end phone categories. Low end phones offer basic voice calling features, mid-range phones enable picture exchange and high end phones are completely programmable that offer full multimedia functionality. These categories offer users a broad range of form factors that balance size, weight and usability metrics.

With varying form factors and functionalities, cellular phones have become devices of choice for persons to carry to stay connected. This in turn has motivated cellular phone manufacturers to incorporate much additional functionality into cellular phones, making them multi-purpose devices, while reducing costs.

With evolution of cellular phones into multi-purpose devices, usage of cellular phones will increase and in particular usage in automobiles is expected to increase as well. Providing new functionality in hands free mode in an automobile is a big challenge.

Currently there are several cellular phone accessories that enable hands free usage of cellular phones within automobiles but each is limited to a fixed functionality. But with programmable cellular phones, new functionality can be added with ease, and existing fixed functionality accessories will not be usable with new functionality. There is a need for a solution that can support new functionality and be forward compatible in order to provide new cellular phone functionality in an automobile. An accessory that can support new functionality in a forward compatible manner and in hands free mode of operation does not exist today. Hence providing new cellular phone functionality into automobiles is a major issue that needs to be resolved. The present invention addresses this issue by providing a solution whereby new cellular phone functionality can be made available in hands free mode of operation in an automobile at low cost and high operational efficiency. Examples of new functionality could include but not limited to streaming and non-streaming multimedia applications, remote surveillance and data gathering.

Usage of cellular phones in automobiles has been found to be highly distractive to drivers. Accidents have been attributed to cellular phone conversations during driving, and, as a result, several countries prohibit usage of cellular phones while driving, or prohibit usage while driving without a hands free mode of operation. This problem of cellular phone usage in an automobile is likely to worsen as usage levels increase with more functionality of high end phones unless there is a hands free solution that can accommodate new functionality as well.

One solution to above problem is to prohibit usage of cellular phones in automobiles completely.

Solutions that completely prohibit cellular phone usage are extremely difficult to justify in countries where people have to drive long distances and spend much time commuting. Any emergency call during periods of driving could be missed and contribute to other problems. Similarly, periodic calls may need to be made, for example, to check on an old parent as people may schedule such calls while driving to optimize stressed schedules. Enforcing such rules will be difficult to implement in countries with several thousand miles of roads to cover. Thus, prohibiting cellular phone usage in automobiles is impractical and may trade one problem for another.

Using a hands free system is the only practical alternative that reduces the stress of holding a cellular phone with one hand thereby improving driving focus levels. But with evolving cellular phone functionality, hands free systems must also evolve to provide newer functionality.

Hands free systems have been in existence for several years. Some cellular phones provide speaker phone functionality with a speaker component to enable hands free operation. But these phones are not usable on noisy roads or in a car poorly shielded for noise such as a convertible with a closed soft top. Most speakers that are embedded in phones are too small to provide high quality base and treble necessary for a clear conversation or high quality music.

Other hands free systems are available as attachments to cellular phones. Such systems provide an external microphone and speaker that is connected using a cable to cellular phones to enable hands free operation. But these systems suffer from similar issues of providing lower quality audio because of limited speaker size and cater only towards voice applications. U.S. Pat. Nos. 6,687,513 and 6,411,823 propose such solutions.

To solve speaker quality issues, there are systems that use an audio cassette adaptor to connect a cellular phone to audio system of an automobile to transfer incoming voice to speakers of an automobile. This solves a problem of incoming audio being heard via automobile speakers, but outgoing audio will suffer from echo effects as most cellular phones that do not support hands free mode do not support echo cancellation. Even in cases where cellular phones support hands free mode and corresponding echo cancellation algorithms, such algorithms are tuned to work with embedded speaker components which have lower amplitude and frequency range. Hence heavily amplified audio from automobile speakers will still exhibit echo effects.

Note that, a connection between a cellular phone and a cassette adaptor may be a wired or wireless connection. Irrespective of connection type, unless a cassette adaptor provides its own set of echo cancellation algorithms, a hands free mode operation for just voice applications using a cassette adaptor is impractical.

Also, a wired cassette adaptor is not practical to be used in all automobiles since audio cassette players in automobiles have different mechanisms to load a cassette. Some audio cassette players will have front loading and some will have side loading mechanism. Some may have an opening in the front and some may be fully covered. Given these differences it is not always possible to draw out a wire from a cassette adaptor to a cellular phone without affecting the performance of an audio cassette player. Hence there is a need for a wireless solution.

U.S. Pat. No. 6,058,319 proposes such a cassette adaptor based solution and suffers from above mentioned shortcomings.

This leads to a possible solution that is a wireless cassette adaptor that provides echo cancellation to inter-operate with a cellular phone. Such systems are in existence by using bluetooth as a wireless networking protocol between cellular phones and cassette adaptors. Wireless cassette adaptors may use analog or digital wireless signals to communicate with cellular phones. Analog wireless signals suffer from low bandwidth and security limitations and hence unusable to transfer private conversations. Whereas digital wireless signals such as bluetooth provide relatively higher bandwidth, they are expensive to implement in terms of battery usage.

In particular, transferring full duplex voice can be easily accommodated using a 64 kilo bits per second pulse code modulated signal, but transferring multimedia content from high end phones, including high quality stereophonic audio requires several megabits of bandwidth. For example, pulse code modulated samples (PCM) with 24-bits of data sampled at 96 kilo hertz requires a 4.39 mega bits per second data rate. Currently, the maximum data rate a bluetooth chipset can provide is 3 mega bits per second which is insufficient for high quality audio transfer. Also, as data rates get higher, digital radio frequency (RF) circuitry consumes substantially more power thereby decreasing battery life.

Hence it can be seen that a wireless cassette adaptor cannot support a full featured high end phone adequately because of requirements for voice and multimedia applications.

To solve bandwidth issues with a wireless accessory, an alternative may be to embed a wireless cassette adaptor with decoding functionality to decode digitally encoded music that is transferred at lower rate. Such cassette adaptors will have at most one or two decoders to maintain cost effectiveness with respect to cellular phones. There are several available digital music formats including advanced audio coding (AAC), motion picture expert group level three (MP3), AU, WAV, OGG etc. Since music formats continue to evolve, a wireless cassette adaptor that has an ability to decode only a few formats will be ineffective with new digital data formats. Hence such an alternative is not forward compatible with evolving functionality of cellular phones that provide multimedia functionality and beyond.

Apart from bandwidth issues associated with a wireless accessory, communication protocols are also important issues. A wireless accessory to a cellular phone must implement standard protocols such that accessories from different vendors may interoperate with different cellular phones. This leads us to the next problem that exists in wireless protocols such as bluetooth. Currently bluetooth supports three protocols, called profiles, related to audio accessories including: headset profile, hands free profile and audio profile. The headset profile enables any wireless accessory to behave like a headset to support full duplex voice transfer with cellular phones. The hands free profile enables an accessory to behave like a speakerphone with a key addition of echo cancellation algorithm inside the accessory. The audio profile enables stereophonic audio to be transferred at a limited rate with a limited codec set. Notice that as new functionality is added, new profiles need to be added to both cellular phones and corresponding accessories. Since these profiles are defined and controlled by standard bodies it may take a very long time before any profile is standardized, thereby contributing to slow evolution of accessory functionality.

As new functionality is added, a new profile or a protocol is needed to communicate between a wireless accessory and a cellular phone. This is an impractical and non-scalable solution because of non-deterministic time intervals for standardized profiles. On the other hand, new generations of high end cellular phones offer much new functionality including the ability to download content with new data formats. However new data formats can only be communicated to an accessory if a standard exists for such a data format communication. Hence a digital wireless accessory is not a forward compatible option that can support both limited and evolving functionality of all ranges of cellular phones Additional examples of protocol evolution problems can be seen with introduction of internet protocol multimedia subsystem (IMS) that introduces new interactive services such as push-to-talk over cellular (PoC) and text messaging. These services require new usage patterns from wireless accessories but this can be done only if both the wireless accessory and the cellular phone understand a common data format and behavior pattern, implying a need for a new profile or protocol.

Wireless accessories suffer from similar problems to support even existing features of cellular phones. For example, voice dialing is a common feature in most cellular phones today, but this is not supported by a bluetooth enabled headset, since current headset and hands-free profile support voice interaction only for a full duplex phone call and not for voice dialing. Similarly if a short message service message (SMS) has been received by the cellular phone, there is no way to dispatch this message to a wireless accessory without a new profile.

Hence it can be seen that wireless accessories have two limitations including lack of support for decoding new data formats and lack of standardized protocols to support new application features. That is, a wireless accessory is not forward compatible with new data format or protocols.

In summary, a new application cannot be accommodated without standardized wireless data exchange and behavior protocols or profiles. Adding more functionality to an accessory to keep abreast of evolving functionality of cellular phones does not solve all limitations mentioned so far and also increases the accessory cost substantially. Hence a wireless cassette adaptor is an impractical solution with regards to forward compatibility.

U.S. Pat. Nos. 6,636,749, 6,542,758 propose Bluetooth based hands-free adaptor and they suffer from shortcomings mentioned above.

There are also systems that are fully integrated with car audio systems but such systems are expensive to install into an older automobile and add at least a thousand dollars extra as an option for a new automobile. These also suffer from forward compatibility issues apart from cost and installation issues.

U.S. Pat. No. 6,847,833 proposes a hands-free system for supporting multiple devices and a connectivity solution for integrating with car stereo systems. The car stereo connectivity solution calls for modifications to car stereo thereby increasing the installation cost. Additionally, this proposed solution does not address any of the forward compatibility issues, such as supporting new media formats or supporting new applications as they become available in mobile phones.

U.S. Pat. No. 6,701,161 proposes a multimedia unit for automotive vehicles. This prior art offers a comprehensive in-vehicle communication and vehicle control solution. It is more suited for newer premier model automobiles because of the cost involved. Additionally, this solution is simply not viable to be installed as after market solution for existing cars to due installation complexities and cost involved. Some systems provide a frequency modulation (FM) transmitter attachment to enable connectivity with automobile audio system. But these systems are limited by FM bandwidth and insecure transmission format permitting persons in the neighborhood to hear private conversations.

U.S. Pat. No. 6,484,040 proposes a hands-free solution for in-vehicle use that uses infrared or radio (FM/AM) radio communication between in-car audio equipment and mobile phone. Existing car audio systems don't support infrared communication. Installing new audio system will increase the cost of the solution. Radio based solutions are neither secure nor of good audio quality. Additionally, this solution will not be able to extend hands-free support to new multi-media applications as they become available in mobile phones. U.S. Pat. No. 6,397,086 which also calls for infrared communication between car audio and phone also suffers from similar shortcomings. U.S. Pat. No. 6,304,764 which calls for cassette adaptor or FM transmitter also suffers from the same limitations. U.S. Pat. No. 6,163,711 which calls for FM transmitter also suffers from the same limitations.

U.S. Pat. No. 3,991,369 proposes a cartridge system providing radio transceiver capability. This describes an accessory for an analog half duplex communication apparatus. It is not a single device solution for hands free cellular phone operation. Another difference to note is that both antenna and microphone are external attachments unlike the present invention. Hence it does not address any of said issues related to hands free forward cellular phone system.

Based on the above analysis of existing and potential solutions that offer a hands free system to a cellular phone in an automobile, it is clear that all such solutions suffer from at-least one of limitations mentioned below:

a) Poor quality because of limited speaker size and performance metrics.
b) Hanging wires causing potential operation problems.
c) Lack of forward compatibility with new data formats because of cost considerations.
d) Lack of forward compatibility with new applications because of slow evolution of new wireless accessory profiles.
e) Poor battery performance with higher data rates with a wireless accessory.
f) High installation cost.
g) High cost of accessories.

As can be seen from above, all known prior art suffers from at least one of said limitations and hence there is a need for a new hands free system that does not suffer from above limitations and offers a full featured, forward compatible hands free system.

BACKGROUND OF THE INVENTION—OBJECTS AND ADVANTAGES

Accordingly, several objects and advantages of the present invention are:

a) To provide a full featured wireless hands free cellular phone system without hanging wires.
b) To deliver high quality interactive multimedia applications in hands free mode leveraging high quality audio of a conventional audio cassette player.
c) To provide a forward compatible hands free cellular phone system that can adapt to new data formats limited only by system resources and not evolving data formats.
d) To provide a forward compatible hands free cellular phone system that can adapt to new applications and not be limited by wireless accessory profiles.
e) To provide the best battery performance even with high data rate applications.
f) To provide a hands free cellular phone system that is inexpensive to install.
g) To control ever increasing costs associated with functionality upgrades of accessories.

SUMMARY

In accordance with present invention a hands free cellular phone system is implemented by building a full featured cellular phone in the form factor of a conventional audio cassette. This eliminates the need for an additional accessory and problems associated with it as mentioned in prior art section.

Latest chip fabrication technologies including 130 nanometer and 90 nanometer technologies have enabled dramatic reduction in cellular chipset sizes and that in turn has enabled reduction in size of a complete cellular phone module. A compact cellular phone module enables building all cellular phone components into a form factor of a conventional audio cassette. The cellular phone device in form factor of conventional audio cassette will henceforth be referred to as casaphone.

Main components of casaphone are, antenna, microphone, electromagnetic transducer, random access memory, read only memory, micro controller unit, cellular access module, keypad, battery and optional list of components including digital signal processor, speaker, liquid crystal display, camera, subscriber identity module and removable storage.

Casaphone interacts with a conventional audio cassette player using an electromagnetic transducer by coupling with electromagnetic sensor of the audio cassette player. This eliminates the need for an additional accessory to interact with a conventional audio system hence eliminating problems that are encountered while using a wireless accessory, including the high cost of a programmable accessory, wireless protocol problems, lack of forward compatibility with new applications and battery problems because of high bandwidth usage. Casaphone also supports an echo cancellation algorithm to avoid echo problems that would otherwise be encountered because of high quality speakers. Casaphone optionally provides a digital signal processor, thereby providing a forward compatible platform that can decode any new data format. Since casaphone can fit into any conventional audio cassette player such as one in an automobile or home, installation costs are negligible. All existing applications including SMS and voice dialing are supported since no new wireless accessory profiles are necessary.

Casaphone is implemented with configurable mix of components to serve all cellular phone categories including low end, mid-range and high end phones. Casaphone also provides a platform to deliver new interactive multimedia services.

It may be seen that combining a full featured cellular phone with a form factor of a conventional audio cassette, provides a unobvious result of a hands free cellular phone system that is full featured, forward compatible and inexpensive to install and operate as compared with any other prior art solution today.

DRAWINGS—FIGURES

Figure 1:
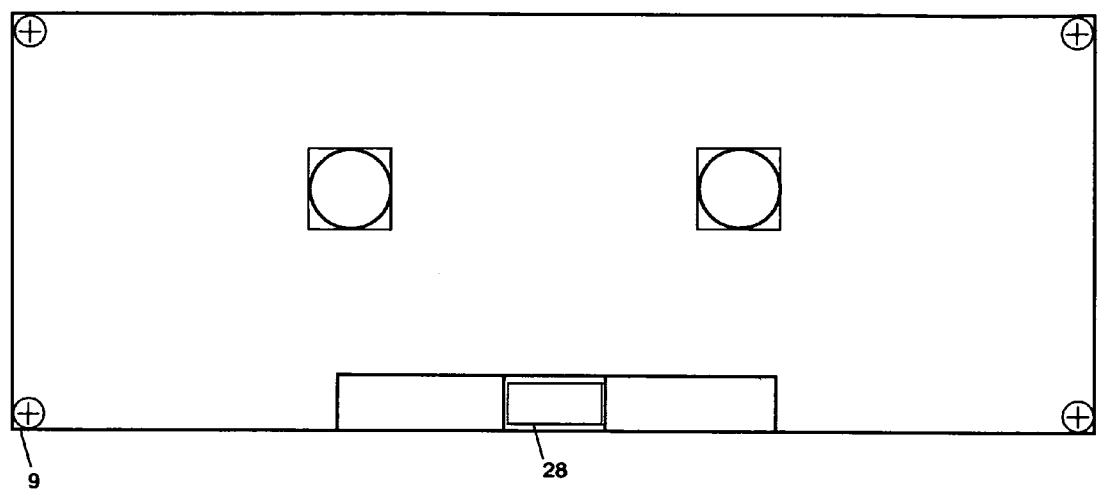
FIG. 1 shows prior art item conventional audio cassette.
Figure 2:
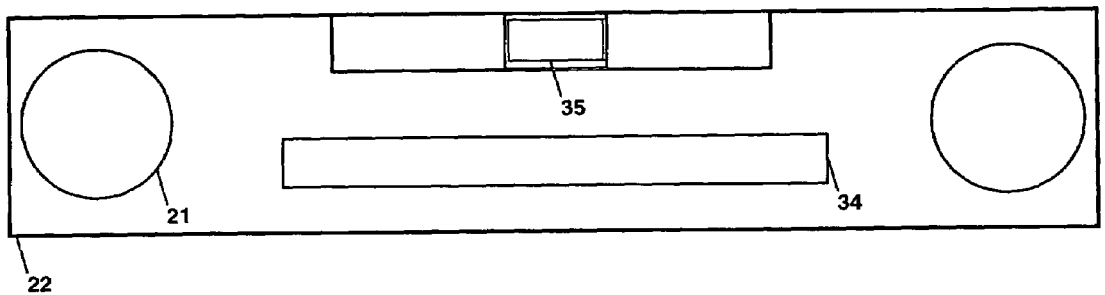
FIG. 2 shows prior art item conventional audio cassette player.
Figure 3:
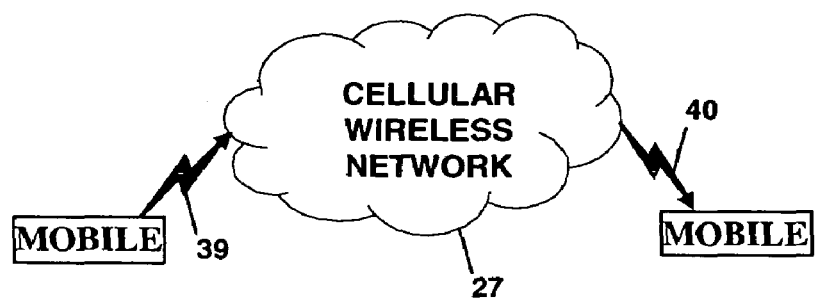
FIG. 3 shows prior art item cellular wireless network.
Figure 4:
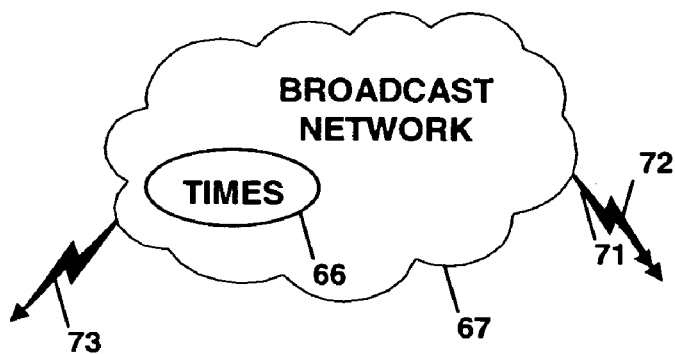
FIG. 4 shows prior art item broadcast network.
Figure 5:
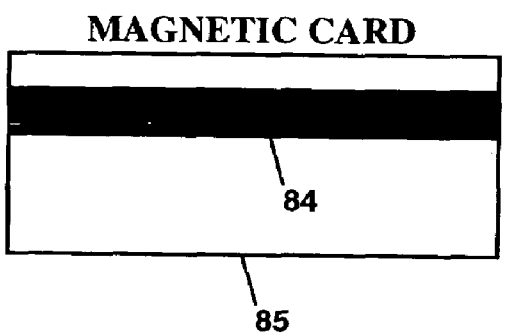
FIG. 5 shows prior art item magnetic card.
Figure 6:
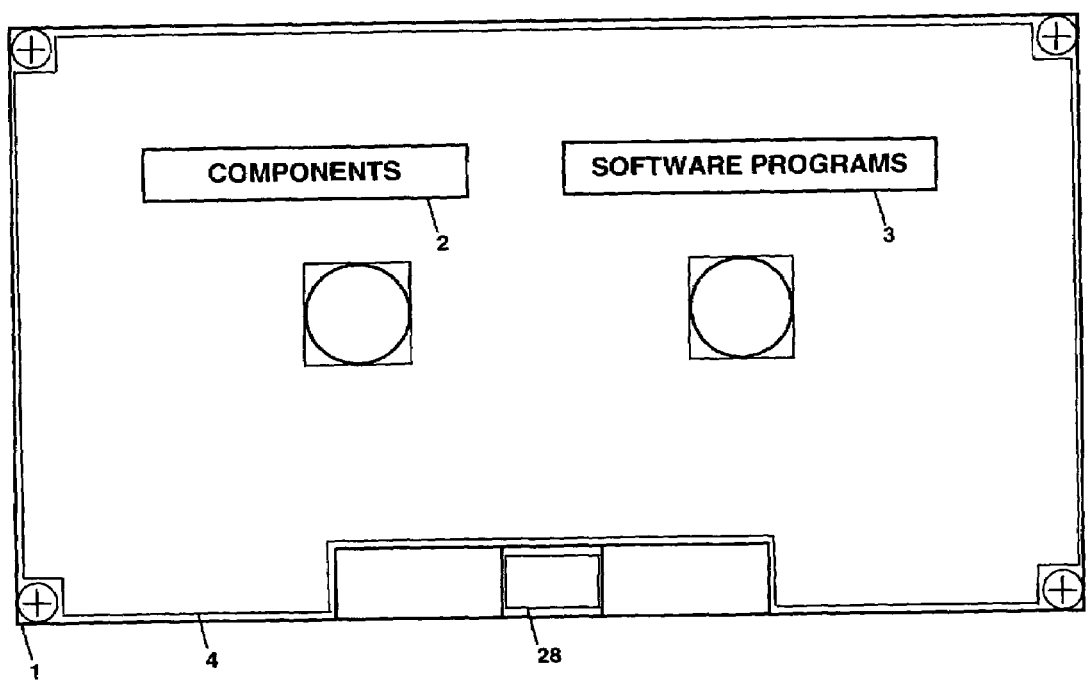
FIG. 6 shows a phone in form factor of a conventional audio cassette and serves as a general representation of cassette form factor phone.

DRAWINGS—REFERENCE NUMERALS 1 cellular phone device in form factor of conventional audio cassette
2 components
3 software programs
4 printed circuit board
5 micro controller unit component
6 general purpose processor component
7 digital signal processor component
8 basic casaphone
9 conventional audio cassette
10 low end casaphone
11 call processing software program
12 cellular access module component
13 address book software program
14 flash memory component
15 subscriber identity module component
16 random access memory component
17 optional voice recognition software program
18 microphone component
19 echo cancellation software program
20 speaker component
21 speakers in conventional audio cassette player
22 conventional audio cassette player
23 read only memory component
24 program specific static data
25 runtime data
26 universal asynchronous receive and transmit (UART) serial line connectivity
27 cellular network
28 electromagnetic transducer component
29 keypad component
30 liquid crystal display component
31 antenna component
32 power supply component
33 casing that enables casaphone coupling
34 cassette slot
35 electromagnetic transducer of conventional audio cassette player
36 pulse code modulated voice samples
37 vocoder software program
38 encoded voice samples
39 up channel of cellular network
40 down channel of cellular network
41 decoded voice samples
42 mid-range casaphone
43 general purpose instructions
44 multimedia processing software program
45 multimedia messages
46 mid-range, camera enabled casaphone
47 digital image sensor module component.
48 mid-range, GPS enabled casaphone
49 GPS component
50 mid-range, camera and GPS enabled casaphone
51 high end, casaphone
52 digital signal processor bridge hardware connectivity
53 digital signal processor bridge protocol software program
54 audio codecs
55 high end, internet protocol multimedia subsystem (IMS) enabled casaphone
56 internet protocol multimedia subsystem client software program
57 media processing software part
58 command processing software part
59 voice activity detection software program (VAD)
60 high end, IMS and GPS enabled casaphone
61 high end, IMS, GPS and camera enabled casaphone
62 high end, IMS, GPS and audio level control software program enabled casaphone
63 audio level control software program
64 high end, IMS and talk back software enabled casaphone
65 interactive talk back software program
66 broadcast times for audio content
67 commercial broadcast radio channels
68 high end, IMS, talk back software, broadcast receiver enabled casaphone
69 wireless audio broadcast receiver component
70 synchronization software program
71 metadata channel
72 broadcast audio content
73 metadata about audio content being broadcast
74 dynamic chat groups
75 high end, IMS, codec download software program enabled casaphone
76 codec download software program
77 high end, IMS, text to speech conversion software program enabled casaphone
78 text to speech conversion software program 79 high end, IMS, text to speech conversion software program and speech to text software program enabled casaphone
80 speech to text conversion software program
81 high end, IMS, speech to text conversion software program enabled casaphone
82 high end, IMS, magnetic card reading and writing software program enabled casaphone
83 magnetic card reading and writing software program
84 magnetic stripes
85 conventional magnetic card
86 subscriber identity chip
87 embedded subscriber identity
88 nickel cadmium battery
89 lithium ion battery
90 lithium polymer battery
91 nickel metal hydride battery
92 fuel cell battery
93 digital radio broadcast receiver
94 amplitude modulation broadcast receiver
95 frequency modulation broadcast receiver
96 satellite radio broadcast receiver
97 bank card
98 credit card
99 debit card
100 automated teller machine card
101 library card
102 hotel card
103 access card
104 step
105 step
106 step
107 step
108 step
109 step
110 step
111 step
112 step
113 step
114 step
115 surveillance state
116 step
117 user initiated image capture event
118 audio activity detection triggered image capture event
119 contiguous image change detection triggered image capture event
120 step
121 step
122 step
123 step
124 user initiated location capture event
125 audio activity detection triggered location capture event
126 contiguous image change detection triggered location capture event
127 step
128 step
129 step
130 step
131 step
132 step
133 step
134 step
135 step
136 step
137 step
138 IMS session
139 step
140 step
141 step
142 step
143 real time traffic conditions
144 step
145 step
146 step
147 group communication channels
148 step
149 step
150 step
151 step
152 step
153 step
154 step
155 step
156 step
157 step
158 step
159 text based content
160 step
161 generated audio content
162 step
163 step
164 recorded speech samples
165 step
166 generated text content
167 step
168 step
169 step
170 step
171 step
172 magnetic card information
173 step

DETAILED DESCRIPTION OF PREFERRED EMBODIMENT

The cellular phone device in the form factor of conventional audio cassette 1 referred to as casaphone is made up of components 2 and software programs 3 that are operatively coupled to each other. All components 2 are directly or indirectly attached to printed circuit board 4. Software programs 3 are executed in one of micro controller unit component 5 or general purpose processor component 6 or digital signal processor component 7. Note that separation between components is on logical level and hence some components such as general purpose processor component 6 may provide functionality of both general purpose processor and micro controller unit.

Figure 7:
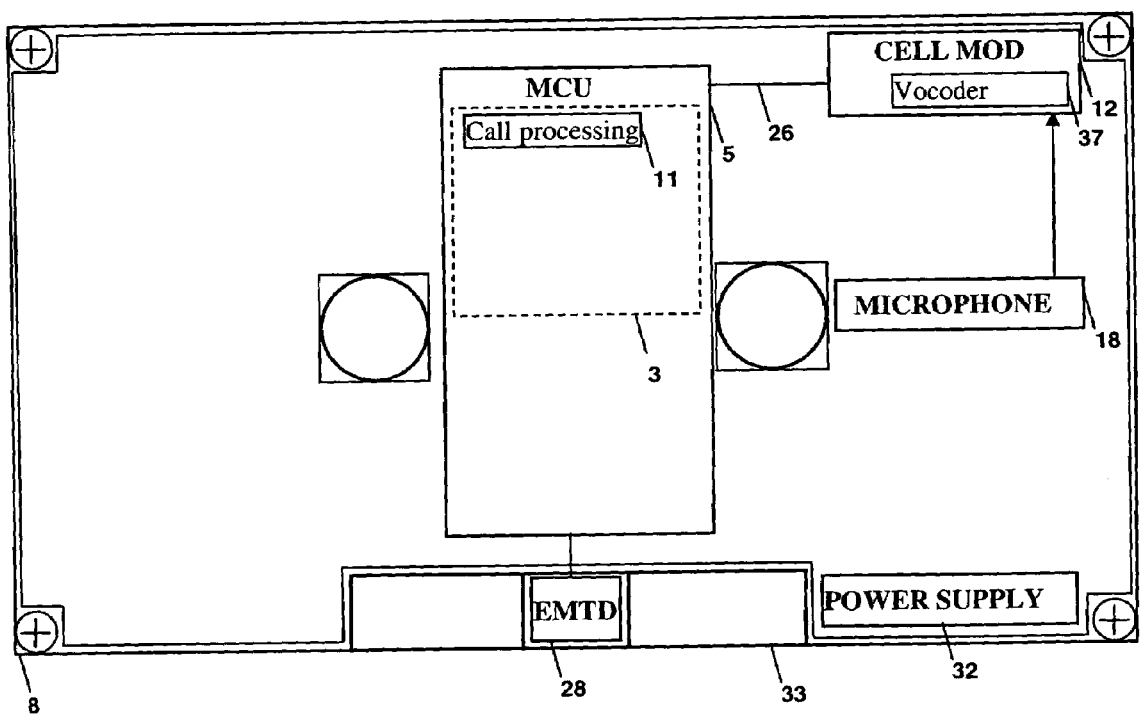
FIG. 7 shows a basic cellular phone that is in the form factor of a conventional audio cassette and is in accordance with claim 1 of present invention.

FIG. 7 shows basic casaphone 8 as a cellular phone in the form factor of conventional audio cassette 9 in accordance with claim 1 of present invention. An explanation of parts of a basic casaphone can be derived from an explanation of low end casaphone 10 as described below.

Figure 8:
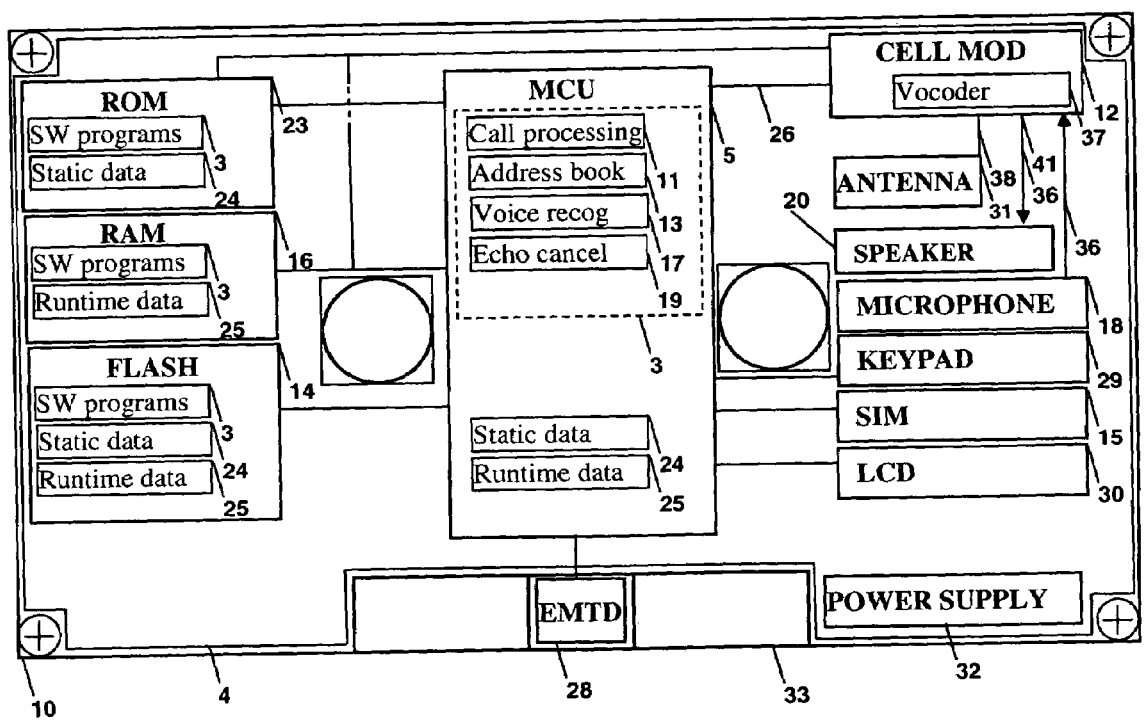
FIG. 8 shows a low end phone that is full featured, in form factor of a conventional audio cassette and is in accordance with claim 2 of present invention.

FIG. 8 shows low end casaphone 10 as a cellular phone in the form factor of conventional audio cassette 9 in accordance with claim 2 of present invention.

The call processing software program 11 enables making cellular phone calls using cellular access module component 12. The address book software program 13 enables storage and retrieval of user addresses and phone numbers. Address book software program 13 can use multiple storage media comprising flash memory component 14, subscriber identity module component 15 based memory, and random access memory component 16. The optional voice recognition software program 17 enables dialing a phone number using voice commands. Voice recognition software program 17 uses the microphone component 18 to receive voice samples from a user and then compares acoustic signature of received voice samples with acoustic signature of stored voice samples in address book software component 13. The echo cancellation software program 19 enables canceling of echoes that might be generated when audio output from speaker component 20 or speakers in conventional audio cassette player 21 is fed back into microphone component 18. Speaker component 20 is optionally used when low end casaphone 10 is not coupled to conventional audio cassette player 22. All software programs 3 are stored in read only memory component 23 along with program specific static data 24 that might be necessary for program initialization. Software programs 3 use random access memory 16 to store runtime data 25.

Micro controller unit component 5 is connected to cellular access module component 12 using hardware connectivity such as universal asynchronous receive and transmit (UART) serial line connectivity 26. Cellular access module component 12 provides interface to cellular network 27 to enable voice and data exchange.

Audio output circuitry is coupled to electromagnetic transducer component 28 to enable transfer of audio content from low end casaphone 10 to conventional audio cassette player 22.

Software programs 3 get input from keypad component 29 and display output to liquid crystal display component 30.

An antenna component 31 is used to transmit and receive voice and data from cellular network 27. The cellular access module component 12 uses the antenna component 31 to access cellular network 27. A subscriber identity module component 15 is used to authenticate a user to cellular network 27. Note that in some cellular phone models subscriber identity module component may not exist as a separate component and authentication data may be part of read only memory 23. All components 2 are powered by power supply component 32 and are directly or indirectly attached to printed circuit board 4. The assembly of components 2 and printed circuit board 4 is embedded in a casing that enables casaphone coupling 33 with conventional audio cassette player 22.

Low end casaphone 10 is turned on using one of the keys from keypad component 29 and call processing program 11 gets loaded into micro controller unit 5. This initiates network connectivity using cellular access module component 12 to register a user with the cellular network 27. Once registration confirmation is received, a corresponding indication is displayed to liquid crystal display component 30.

After this, a new call can be established by dialing phone numbers on keypad component 29 or picking a phone number from address book software program 13. Voice dialing using optional voice recognition software program 17 can also be used to dial a particular number. Low end casaphone 10 is inserted into conventional audio cassette player 22 using appropriate cassette slot 34 of conventional audio cassette player 22. Low end casaphone 10 may be inserted into conventional audio cassette player 22 after call initiation, if call is dialed using keypad component 29 or it can be inserted first into conventional audio cassette player 22 and then call initiation can be done using voice dialing. In either case electromagnetic transducer component 28 of low end casaphone 10 is electromagnetically coupled with electromagnetic transducer of conventional audio cassette player 35.

After a call is established with another user, a full duplex voice channel is set up to enable a two way conversation. Voice from microphone 18 is generated as pulse code modulated voice samples 36 and is passed to cellular access module component 12 that encodes using appropriate vocoder software program 37 that is accepted by a cellular network to generate encoded voice samples 38. Note that cellular network could be based on standards such as global system for mobiles (GSM), code division multiple access (CDMA), time division multiple access (TDMA), wide band code division multiple access (WCDMA), personal communication service (PCS). After encoding, the encoded voice samples 38 are sent to cellular network using cellular access module component 12. This uses a channel of cellular network 39 to transfer encoded voice samples 38 in a timely manner. On the receiving end, cellular access module component 12 receives encoded voice samples 38 using down channel of cellular network 40 and decodes using vocoder 37 and generates decoded voice samples 41 as pulse code modulated voice samples 36. These decoded pulse code modulated voice samples 36 are then routed to speaker component 20 when low end casaphone 10 is not coupled to conventional audio cassette player 22. Note that there can be situations when casaphone electromagnetic transducer 28 is not coupled to electromagnetic transducer 35 of conventional audio cassette player 22. This can happen when low end casaphone 10 is used in isolation as a regular cellular phone, or when forward or rewind or pause or mute buttons of conventional audio cassette player 22 are being used even when low end casaphone 10 is inserted into conventional audio cassette player 22. When low end casaphone 10 is coupled to conventional audio cassette player 22, the decoded pulse code modulated voice samples 36 are routed to electromagnetic transducer 28 of low end casaphone 10, which is electromagnetically coupled to electromagnetic transducer 35 of conventional audio cassette player 22, which in turn is connected to speakers in conventional audio cassette player 21 to hear the voice from other party. Note that to hear voice, conventional audio cassette player 22 must be turned on.

Echo cancellation software program 19 prevents voice output from speakers in conventional audio cassette player 21 to be routed back through microphone 18.

Figure 9:
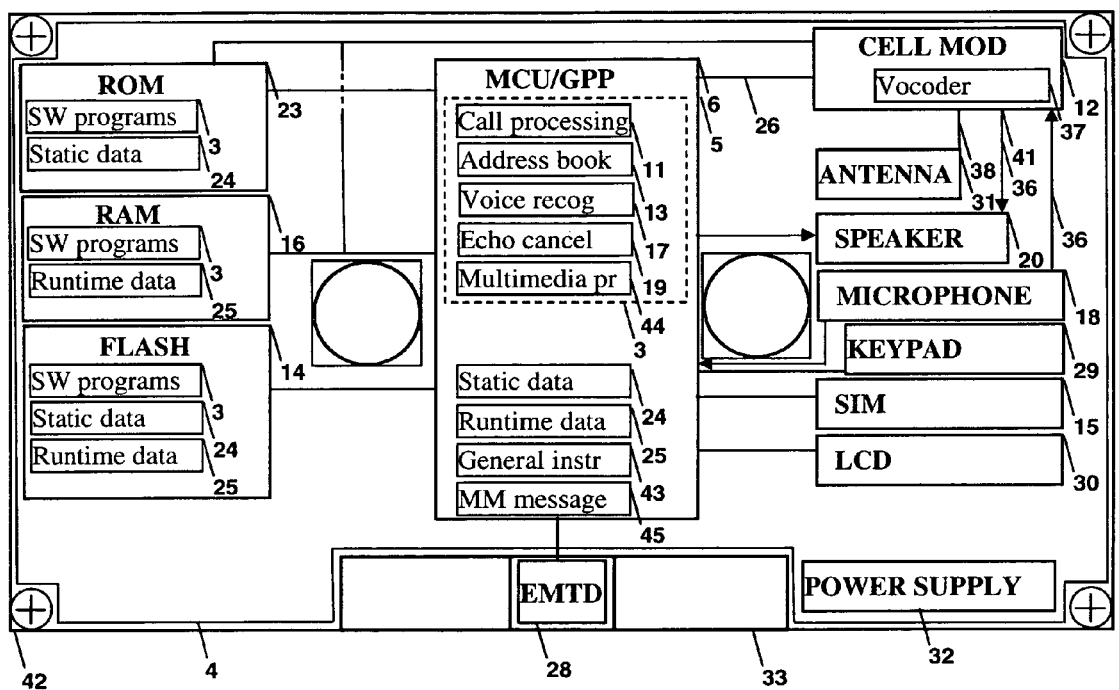
FIG. 9 shows a mid-range, phone that is full featured, in form factor of a conventional audio cassette, has a general purpose processor and is in accordance with claim 3 of present invention.

FIG. 9 shows mid-range casaphone 42, as a cellular phone in form factor of conventional audio cassette 9 in accordance with claim 3 of present invention. Mid-range, casaphone 42 is an extension to low end, casaphone 10. A general purpose processor component 6 is added to enable execution of general purpose instructions 43 in addition to software programs 3. Note that general purpose processor component 6 may also function as a micro controller unit as mentioned earlier. General purpose processor component 6 can have processing range up to four hundred million instructions per second (MIPS). With higher MIPS general purpose processors can execute basic multimedia operations including decoding multimedia messages using multimedia processing software program 44. Mid-range, casaphone 42 enables playing out multimedia messages 45 that constitute voice and audio samples through speakers in conventional audio cassette player 21.

Figure 10:
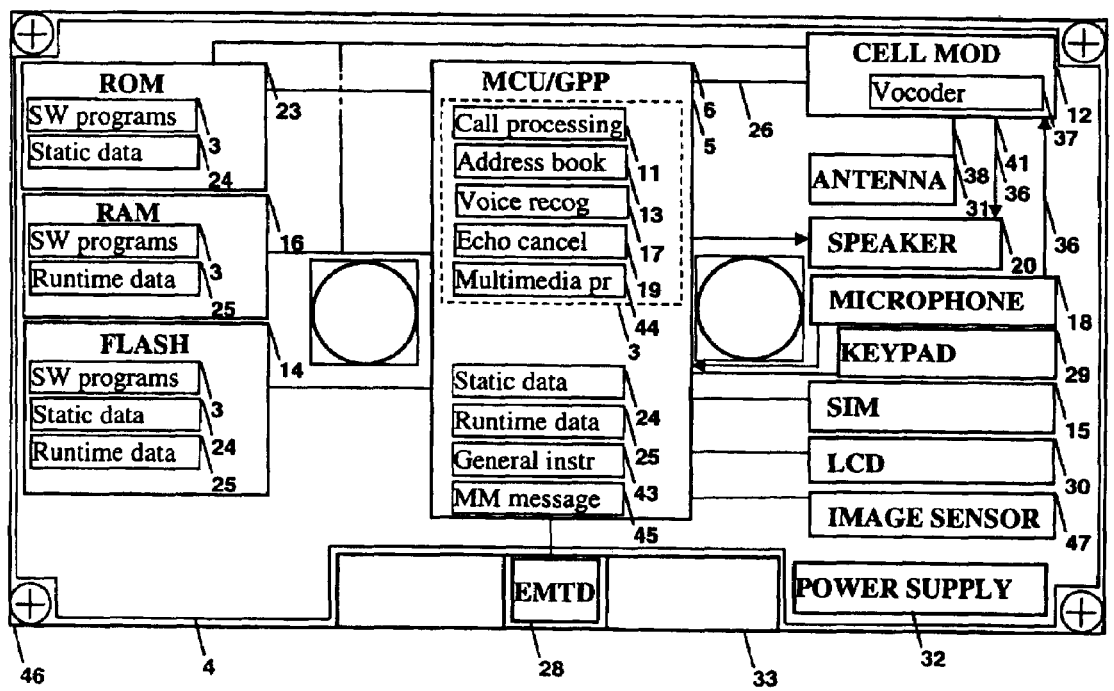
FIG. 10 shows a mid-range, phone that is full featured, in form factor of a conventional audio cassette, has a general purpose processor, a digital image sensor module component and is in accordance with claim 4 of present invention.

FIG. 10 shows mid-range, camera enabled casaphone 46, as a cellular phone in form factor of conventional audio cassette 9 in accordance with claim 4 of present invention. Mid-range, camera enabled casaphone 46 is an extension to mid-range, casaphone 42. An digital image sensor module component 47 is added to enable capturing digital images that are still or moving. Digital image sensor module component 47 is connected to general purpose processor component 6. Adding digital image sensor module component 47 also enables remote monitoring services that offer an extra level of protection as compared with other remote monitoring devices, as casaphone can be disguised as a conventional audio cassette that is not easy to differentiate. Mid-range, camera enabled casaphone 46 has the form factor of a conventional audio cassette 9 and hence it is not easily visible among other conventional audio cassettes 9. This prevents immediate discovery and disabling of mid-range, camera enabled casaphone 46 thereby providing extra level of protection without investing in look alike dummy devices.

Figure 11:
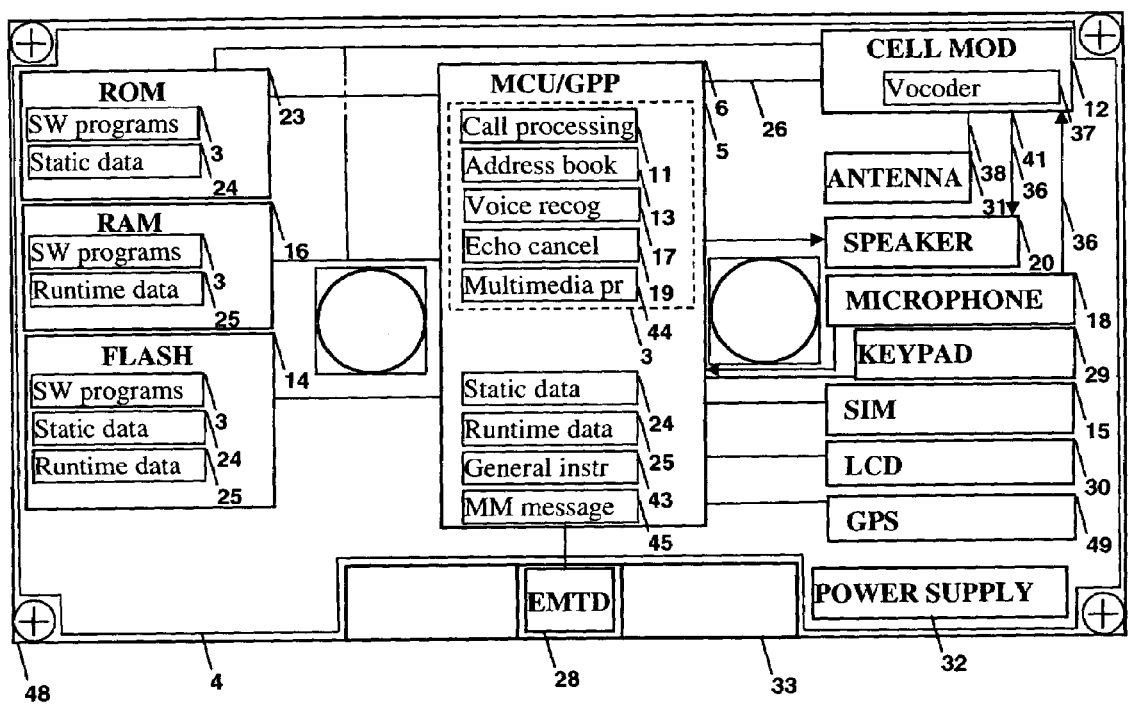
FIG. 11 shows a mid-range, phone that is full featured, in form factor of a conventional audio cassette, has a general purpose processor, a global positioning system (GPS) component and is in accordance with claim 5 of present invention.

FIG. 11 shows mid-range, GPS enabled casaphone 48, as a cellular phone in form factor of conventional audio cassette 9 in accordance with claim 5 of present invention. Mid-range, GPS enabled casaphone 48 is an extension to mid-range, casaphone 42. A GPS component 49 is added to enable capture of location information and use it for notification purposes when a remote resource is associated with mid-range, GPS enabled casaphone 48. GPS component 49 is connected to general purpose processor component 6. Form factor of conventional audio cassette 9 enables hiding of mid-range, GPS enabled casaphone 48 from immediate view, thereby serving surveillance and location notification services more effectively.

Figure 12:
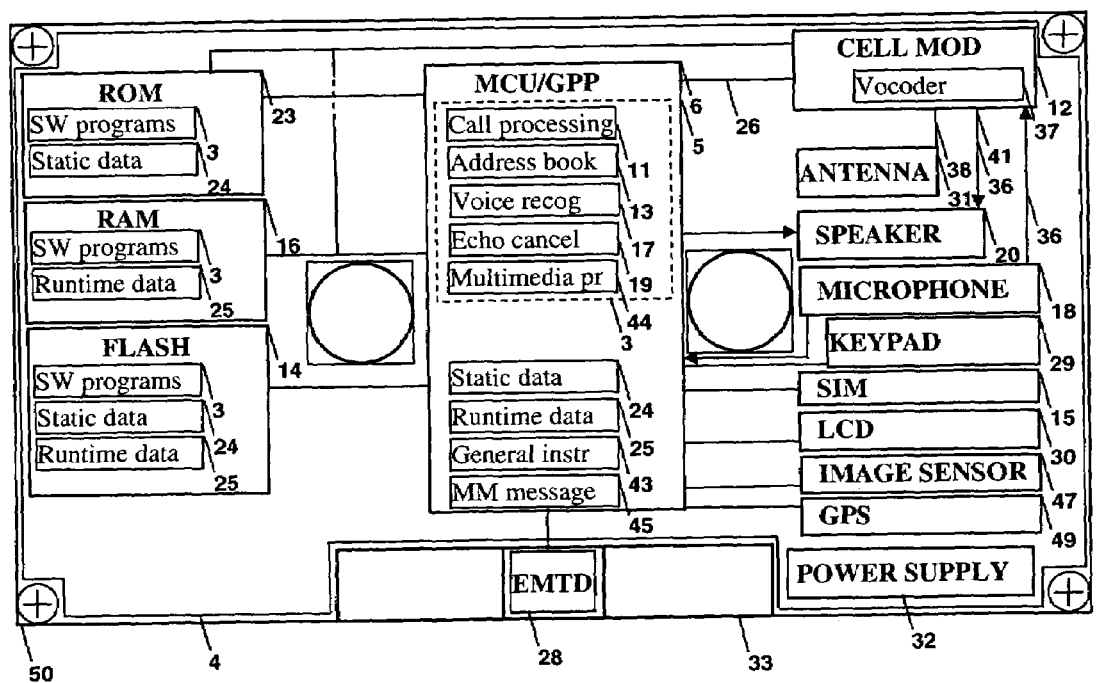
FIG. 12 shows a mid-range, phone that is full featured, in form factor of a conventional audio cassette, has a general purpose processor, a digital image sensor module component, a GPS component and is in accordance with claim 6 of present invention.

FIG. 12 shows mid-range, camera and GPS enabled casaphone 50, as a cellular phone in form factor of conventional audio cassette 9 in accordance with claim 6 of present invention. Mid-range, camera and GPS enabled casaphone 50 is an extension to mid-range, casaphone 42. A GPS component 49 and a digital image sensor module component 47 are added. Both GPS component 49 and digital image sensor module component 47 are connected to general purpose processor component 6. This enables location notification and remote monitoring services with a single device. Form factor of conventional audio cassette 9 enables hiding of mid-range, camera and GPS enabled casaphone 50 from immediate view, thereby serving surveillance and location notification services more effectively.

Figure 13:
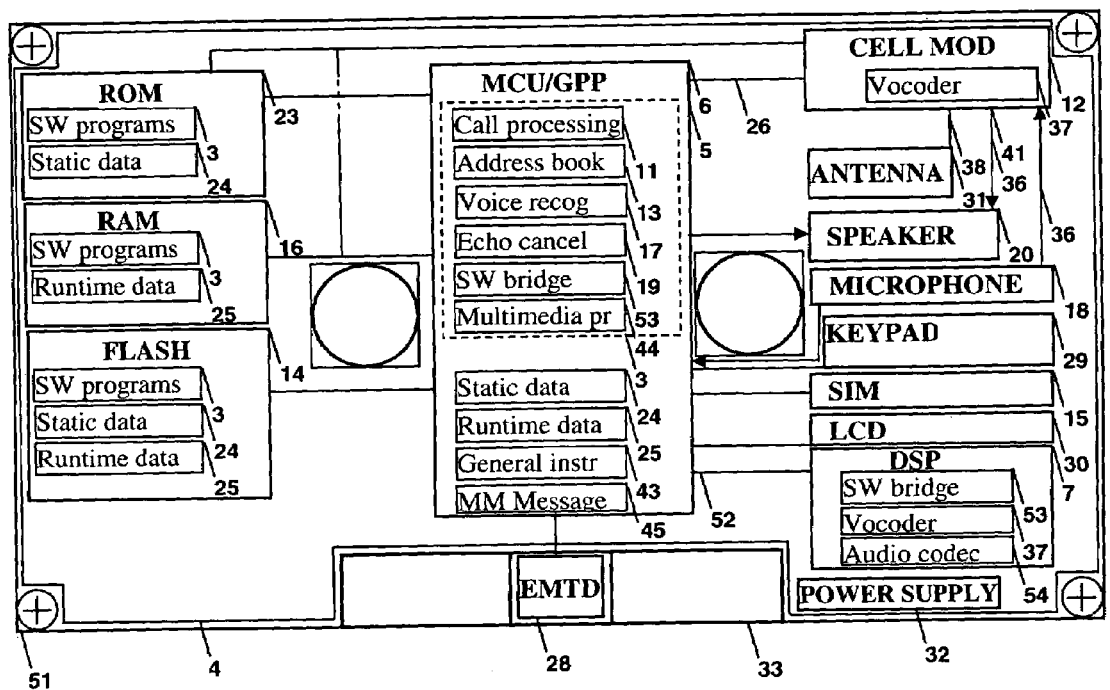
FIG. 13 shows a high end, phone that is full featured, in form factor of a conventional audio cassette, has a general purpose processor, a digital signal processor and is in accordance with claim 7 of present invention.

FIG. 13 shows high end, casaphone 51, as a cellular phone in form factor of conventional audio cassette 9 in accordance with claim 7 of present invention. High end, casaphone 51 is an extension to mid-range, casaphone 42. A digital signal processor component 7 is added to enable processing of digital signals. This digital signal processor component 7 is connected to general purpose processor component 6 with a digital signal processor bridge hardware connectivity 52 and digital signal processor bridge protocol software program 53. Digital signal processor component 7 enables decoding and encoding of digital signals such as in music. Hence High end, casaphone 51 can be used as a multimedia platform to play and record music and other audio formats while coupled to conventional audio cassette player 22. This enables users hearing to high quality music and other multimedia content without limitation to audio codecs 54 or vocoders 37.

Figure 14:
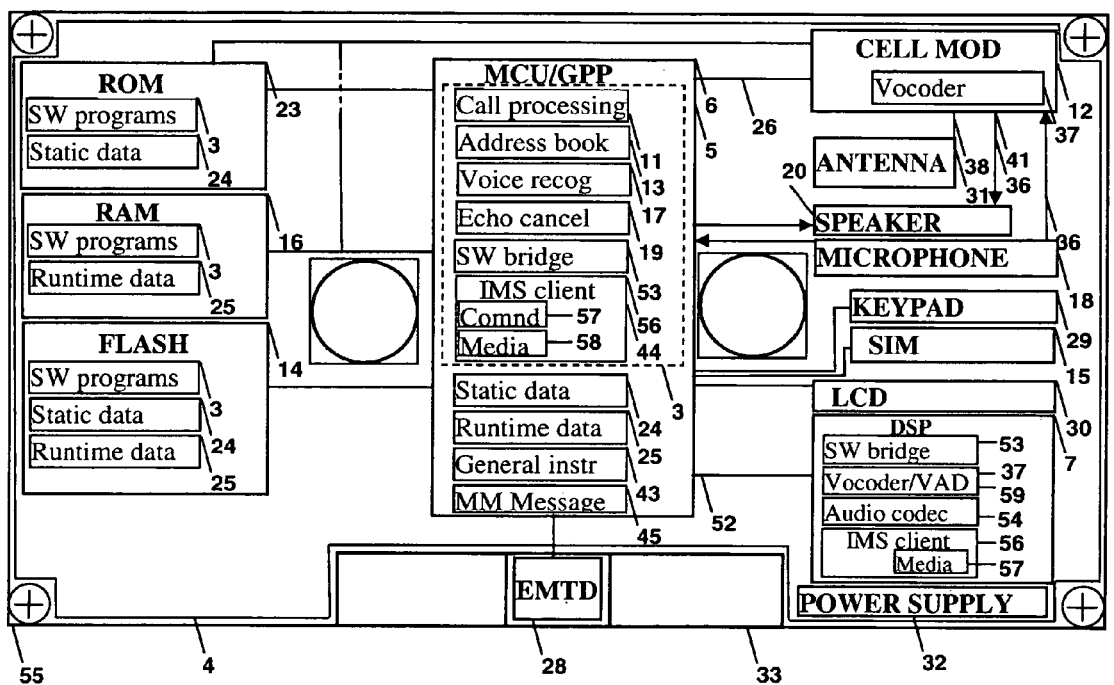
FIG. 14 shows a high end, phone that is full featured, in form factor of a conventional audio cassette, has a general purpose processor, a digital signal processor, a internet protocol multimedia subsystem client software program and is in accordance with claim 8 of present invention.

FIG. 14 shows high end, internet protocol multimedia subsystem (IMS) enabled casaphone 55, as a cellular phone in form factor of conventional audio cassette 9 in accordance with claim 8 of present invention. High end, internet protocol multimedia subsystem enabled casaphone 55 is an extension to high end, casaphone 51. A internet protocol multimedia subsystem client software program 56 is added to set of programs 3. This software program has its functionality split between media processing software part 57 and command processing software part 58. Media processing software part 57 uses digital signal processor component 7 to encode and decode multimedia content and command processing software part 58 uses general purpose processor 6. A voice activity detection software program (VAD) 59 is added to enable voice detection. A vocoder software program 37 is added to enable encoding and decoding of voice samples for real time interactive multimedia applications using digital signal processor component 7 in addition to standard vocoder in cellular access module component 12. High end, internet protocol multimedia subsystem enabled casaphone 55 enables real time interactive multimedia applications such as push to talk and voice over internet protocol.

Figure 15:
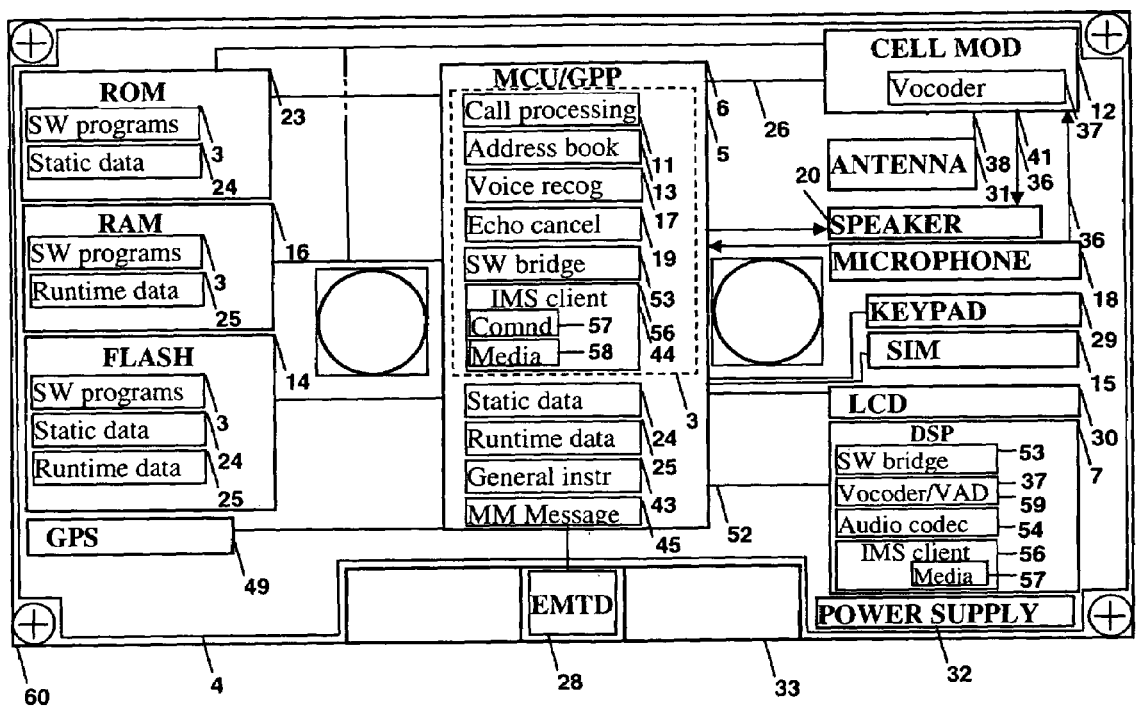
FIG. 15 shows a high end, phone that is full featured, in form factor of a conventional audio cassette, has a general purpose processor, a digital signal processor, a internet protocol multimedia subsystem client software program and a GPS component and is in accordance with claim 9 of present invention.

FIG. 15 shows high end, IMS and GPS enabled casaphone 60, as a cellular phone in form factor of conventional audio cassette 9 in accordance with claim 9 of present invention. High end, IMS and GPS enabled casaphone 60 is an extension to high end, IMS enabled casaphone 55. A GPS component 49 is added. GPS component 49 is connected to general purpose processor component 6. High end, IMS and GPS enabled casaphone 60 enables interactive location based services and navigation capabilities.

Figure 16:
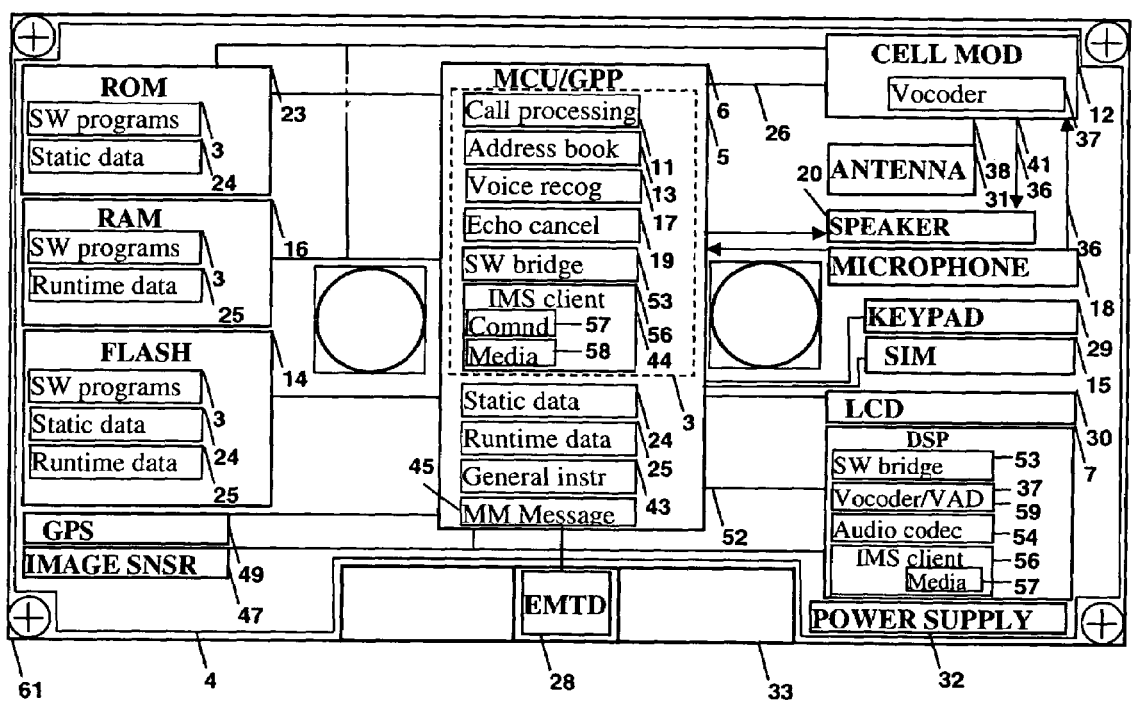
FIG. 16 shows a high end, phone that is full featured, in form factor of a conventional audio cassette, has a general purpose processor, a digital signal processor, internet protocol multimedia subsystem client software program, a GPS component, an digital image sensor module component and is in accordance with claim 10 of present invention.
Figure 17:
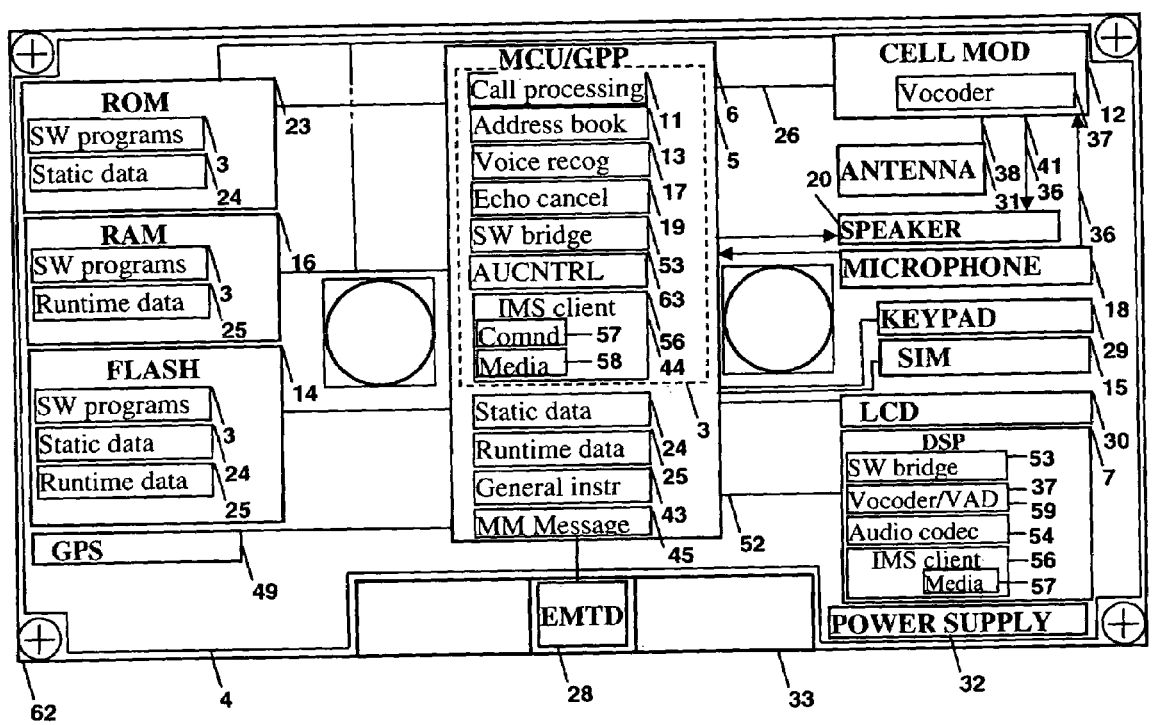
FIG. 17 shows a high end, phone that is full featured, in form factor of a conventional audio cassette, has a general purpose processor, a digital signal processor, a internet protocol multimedia subsystem client software program, a GPS component, an audio control software program (AUCNTRL) and is in accordance with claim 11 of present invention.

FIG. 16 shows high end, IMS, GPS and camera enabled casaphone 61, as a cellular phone in form factor of conventional audio cassette 9 in accordance with claim 10 of present invention. High end, IMS, GPS and camera enabled casaphone 61 is an extension to high end, IMS, GPS enabled casaphone 60. A digital image sensor module component 47 is added. The digital image sensor module component 47 is connected to general purpose processor 6 and digital signal processor 7. High end, IMS, GPS and camera enabled casaphone 61 enables real time interactive monitoring and tracking services FIG. 17 shows high end, IMS, GPS and audio level control software program enabled casaphone 62, as a cellular phone in form factor of conventional audio cassette 9 in accordance with claim 11 of present invention. High end, IMS, GPS and audio enabled casaphone 62 is an extension to high end, IMS, GPS enabled casaphone 60. An audio level control software program 63 is added to enable automatic control of volume levels of audio output from speakers in conventional audio cassette player 21. This control of volume levels is based on street conditions derived from co-ordinates based on GPS 49.

Figure 18:
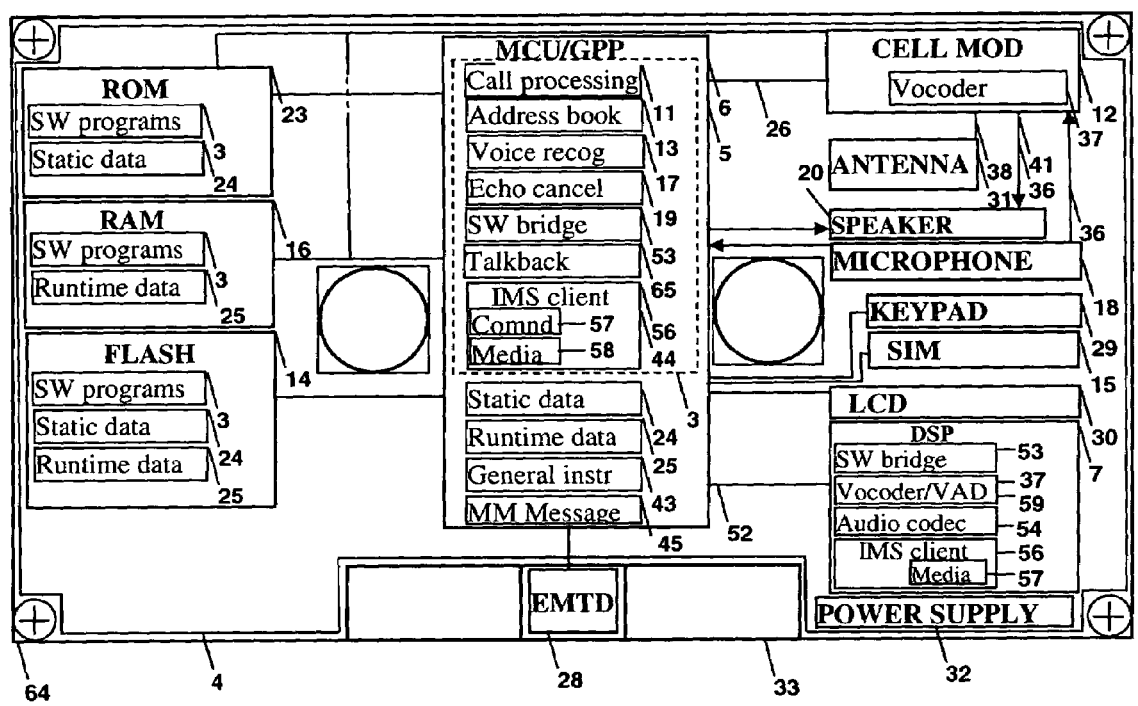
FIG. 18 shows a high end, phone that is full featured, in form factor of a conventional audio cassette, has a general purpose processor, a digital signal processor, internet protocol multimedia subsystem client software program, and interactive talk back software program (TLKBK) and is in accordance with claim 12 of present invention.

FIG. 18 shows high end, IMS and talk back software enabled casaphone 64, as a cellular phone in the form factor of a conventional audio cassette 9 in accordance with claim 12 of present invention. High end, IMS and talk back software enabled casaphone 64 is an extension to high end, IMS enabled casaphone 55. A interactive talk back software program 65 is added to enable conversation to a group of participants with common interest such as commercial broadcast audio content, using internet protocol multimedia subsystem client software program 56. Interactive talk back software program 65 sets up real time interactive chat groups using a combination of internet protocol multimedia subsystem client software program 56 and optional broadcast times for audio content 66 used in commercial broadcast radio channels 67. Broadcast times for audio content 66 are loaded into high end, IMS and talk back software enabled casaphone 64 by using internet protocol multimedia subsystem software program 56.

Figure 19:
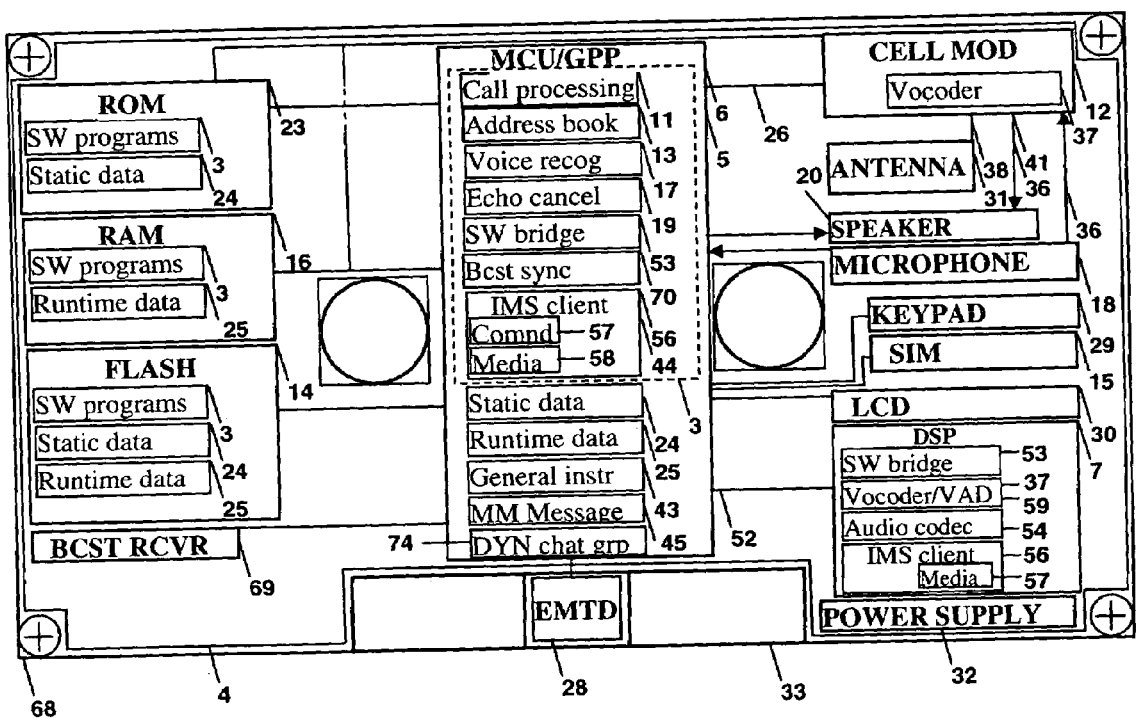
FIG. 19 shows a high end, phone that is full featured, in form factor of a conventional audio cassette, has a general purpose processor, a digital signal processor, internet protocol multimedia subsystem client software program, interactive talk back software program, a wireless audio broadcast receiver (BCST RCVR) and is in accordance with claim 13 of present invention.

FIG. 19 shows high end, IMS, talk back software, broadcast receiver enabled casaphone 68, as a cellular phone in the form factor of conventional audio cassette 9 in accordance with claim 13 of present invention. High end, IMS, talk back software, broadcast receiver enabled casaphone 68 is an extension to high end, IMS and talk back software enabled casaphone 64. A wireless audio broadcast receiver component 69 is added and connected to general purpose processor 6. A synchronization software program 70 is also added to high end, IMS, talk back software, broadcast receiver enabled casaphone 68. This synchronization software program 70 receives information about chat group identification from broadcast receiver 69. Some commercial broadcast radio channels 67 received in wireless audio broadcast receiver component 69 have metadata channel 71 about broadcast audio content 72 that is used to broadcast metadata about audio content being broadcast 73. This metadata 73 is used by synchronization software program 70 to create dynamic chat groups 74.

Figure 20:
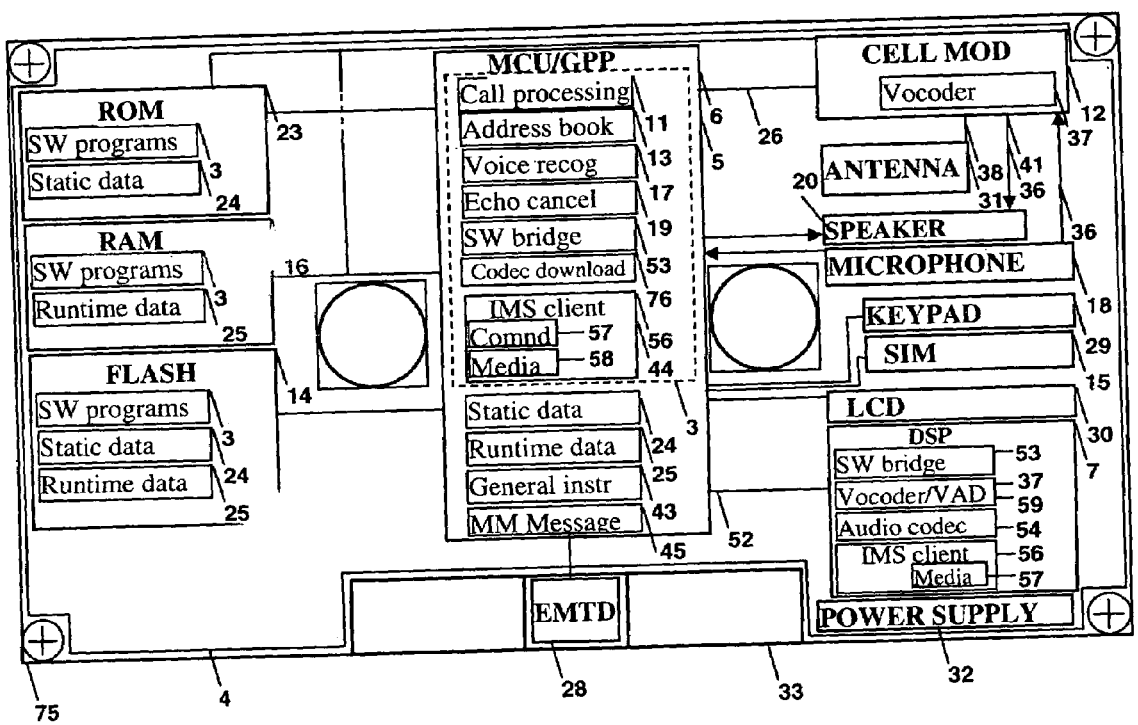
FIG. 20 shows a high end, phone that is full featured, in form factor of a conventional audio cassette, has a general purpose processor, a digital signal processor, internet protocol multimedia subsystem client software program, a codec download software program and is in accordance with claim 14 of present invention.

FIG. 20 shows high end, IMS, codec download software program enabled casaphone 75, as a cellular phone in the form factor of conventional audio cassette 9 in accordance with claim 14 of present invention. High end, codec download software program enabled casaphone 75 is an extension to high end, IMS enabled casaphone 55. A codec download software program 76 is added. Codec download software program 76 enables downloading of audio codecs to enable decoding audio data formats using a combination of general purpose processor 6 and digital signal processor 7 thereby enabling real time audio streaming applications such as internet radio.

Figure 21:
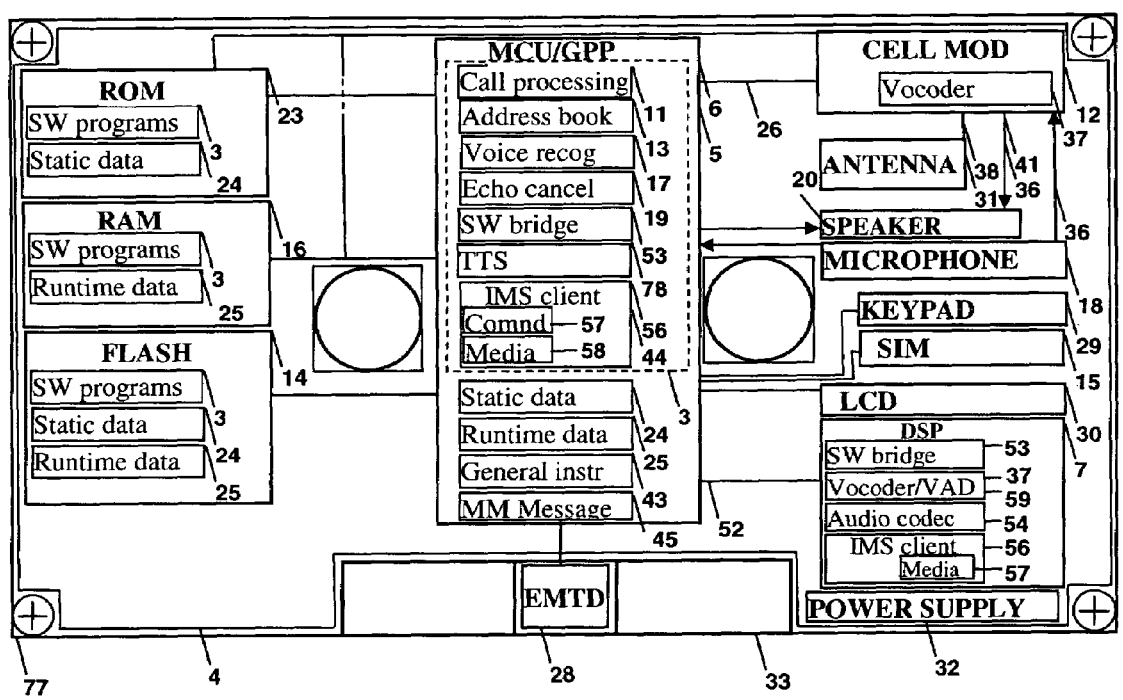
FIG. 21 shows a high end, phone that is full featured, in form factor of a conventional audio cassette, has a general purpose processor, a digital signal processor, internet protocol multimedia subsystem client software program, text to speech conversion software program (TTS) and is in accordance with claim 15 of present invention.

FIG. 21 shows high end, IMS, text to speech conversion software program enabled casaphone 77, as a cellular phone in the form factor of conventional audio cassette 9 in accordance with claim 15 of present invention. High end, text to speech conversion software program enabled casaphone 77 is an extension to high end, IMS enabled casaphone 55. A text to speech conversion software program 78 is added. Text to speech software program 78 uses general purpose processor 6 and digital signal processor 7 to enable real time interactive text to speech applications such as on demand news clips.

Figure 22:
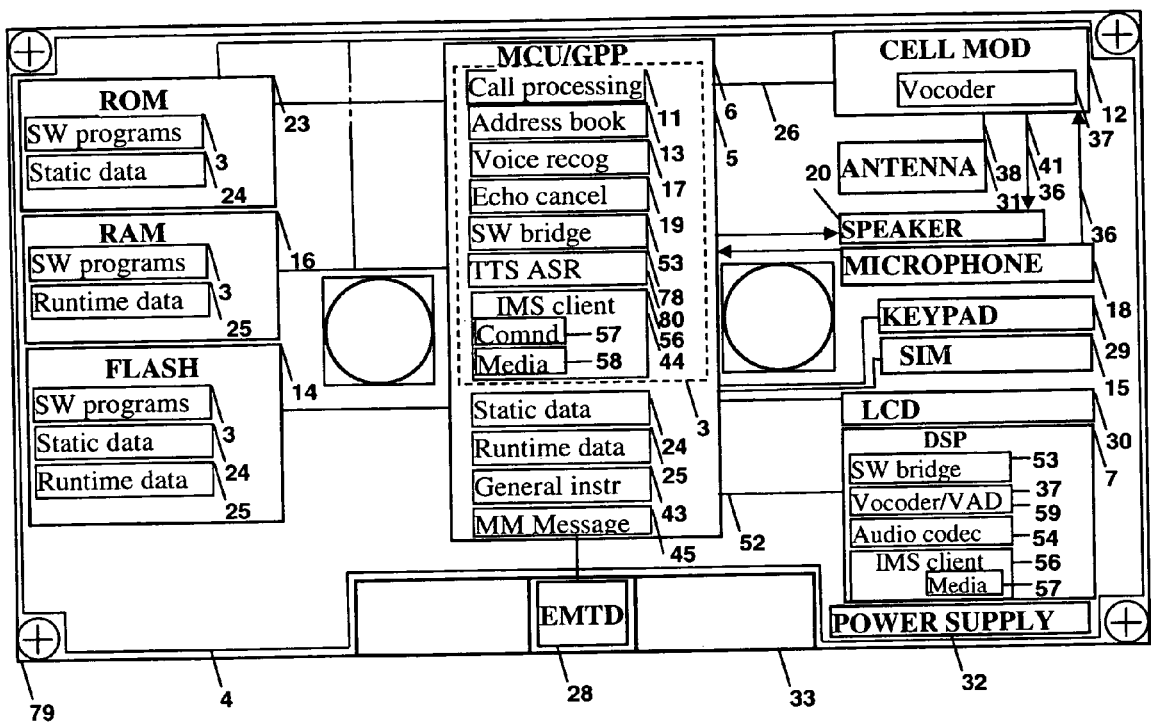
FIG. 22 shows a high end, phone that is full featured, in form factor of a conventional audio cassette, has a general purpose processor, a digital signal processor, internet protocol multimedia subsystem client software program, text to speech software program, speech to text conversion software program (ASR) and is in accordance with claim 16 of present invention.

FIG. 22 shows high end, IMS, text to speech conversion software program and speech to text software program enabled casaphone 79, as a cellular phone in the form factor of conventional audio cassette 9 in accordance with claim 16 of present invention. High end, text to speech conversion software program and speech to text software program enabled casaphone 79 is an extension to high end, IMS, text to speech software program enabled casaphone 77. A speech to text conversion software program 80 is added. Speech to text software program 80 uses general purpose processor 6 and digital signal processor 7 and enables real time interactive multimodal applications such as interactive storybooks with content being delivered as inter mixed audio, voice and text data.

Figure 23:
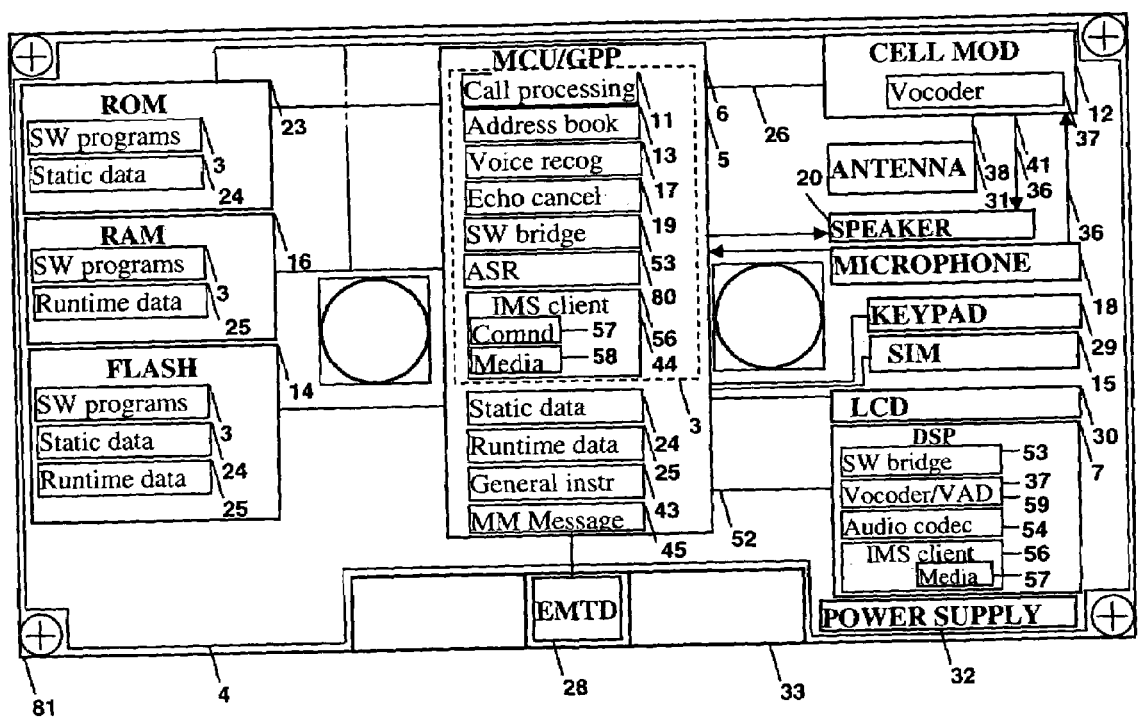
FIG. 23 shows a high end, phone that is full featured, in form factor of a conventional audio cassette, has a general purpose processor, a digital signal processor, internet protocol multimedia subsystem client software program, speech to text conversion software program and is in accordance with claim 17 of present invention.

FIG. 23 shows high end, IMS, speech to text conversion software program enabled casaphone 81, as a cellular phone in the form factor of conventional audio cassette 9 in accordance with claim 17 of present invention. High end, speech to text conversion software program enabled casaphone 81 is an extension to high end, IMS enabled casaphone 55. A speech to text conversion software program 80 is added. Speech to text software program 80 uses general purpose processor 6 and digital signal processor 7 to enable real time interactive speech to text applications such as voice browsing and voice based email.

Figure 24:
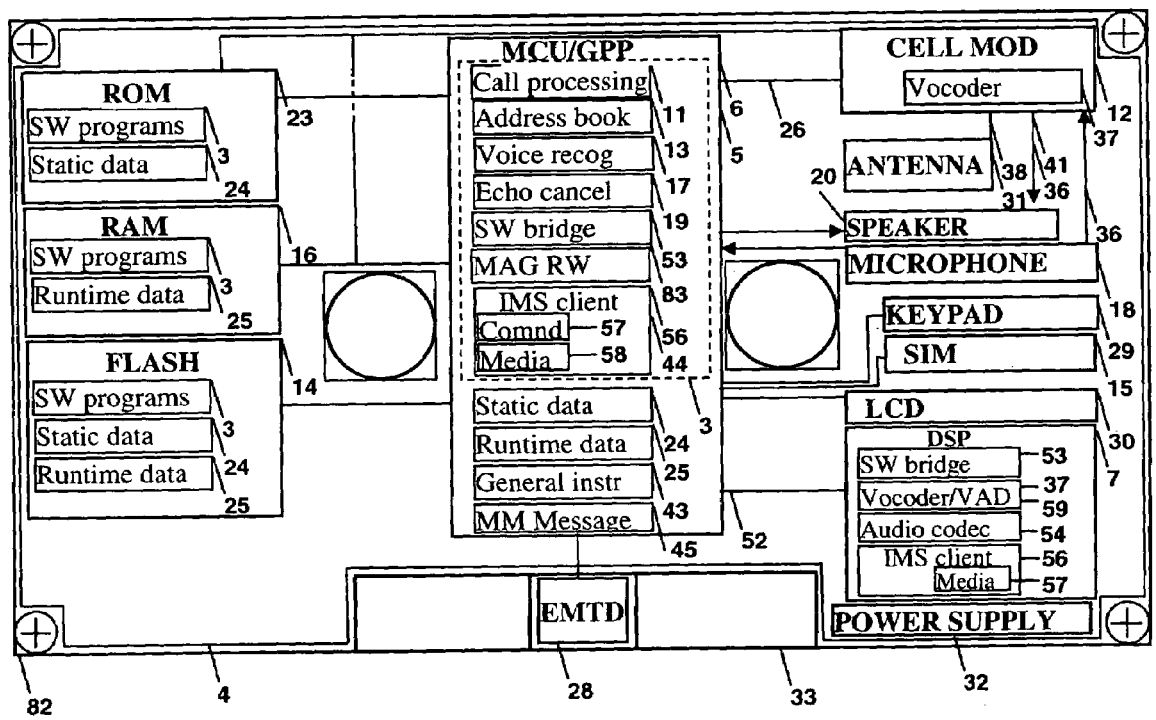
FIG. 24 shows a high end, phone that is full featured, in form factor of a conventional audio cassette, has a general purpose processor, a digital signal processor, internet protocol multimedia subsystem client software program, magnetic card reading and writing software program (MAGNETIC RW) and is in accordance with claim 18 of present invention.

FIG. 24 shows high end, IMS, magnetic card reading and writing software program enabled casaphone 82, as a cellular phone in the form factor of conventional audio cassette 9 in accordance with claim 18 of present invention. High end, magnetic card reading and writing software program enabled casaphone 81 is an extension to high end, IMS enabled casaphone 55. A magnetic card reading and writing software program 83 is added. Magnetic card reading and writing software program 83 is executed on general purpose processor 6 to control power metrics of electromagnetic transducer component 28 to enable reading and writing onto magnetic stripes 84 of conventional magnetic cards 85. This enables applications that require on demand reading and writing of magnetic cards such as on demand credit card writing to prevent fraudulent transactions with per transaction magnetic information coding.

Figure 25:
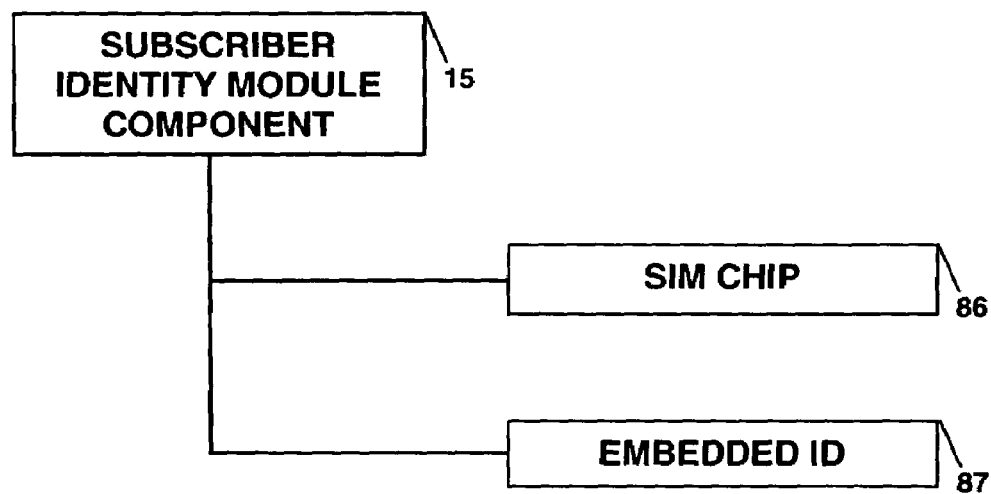
FIG. 25 shows embodiments of subscriber identity module component in accordance with claim 19 and claim 41 of present invention.

FIG. 25 shows embodiments of subscriber identity module component 15 in accordance with claim 2 of present invention. Subscriber identity module component 15 can be a separate subscriber identity chip 86, embedded subscriber identity 87.

Figure 26:
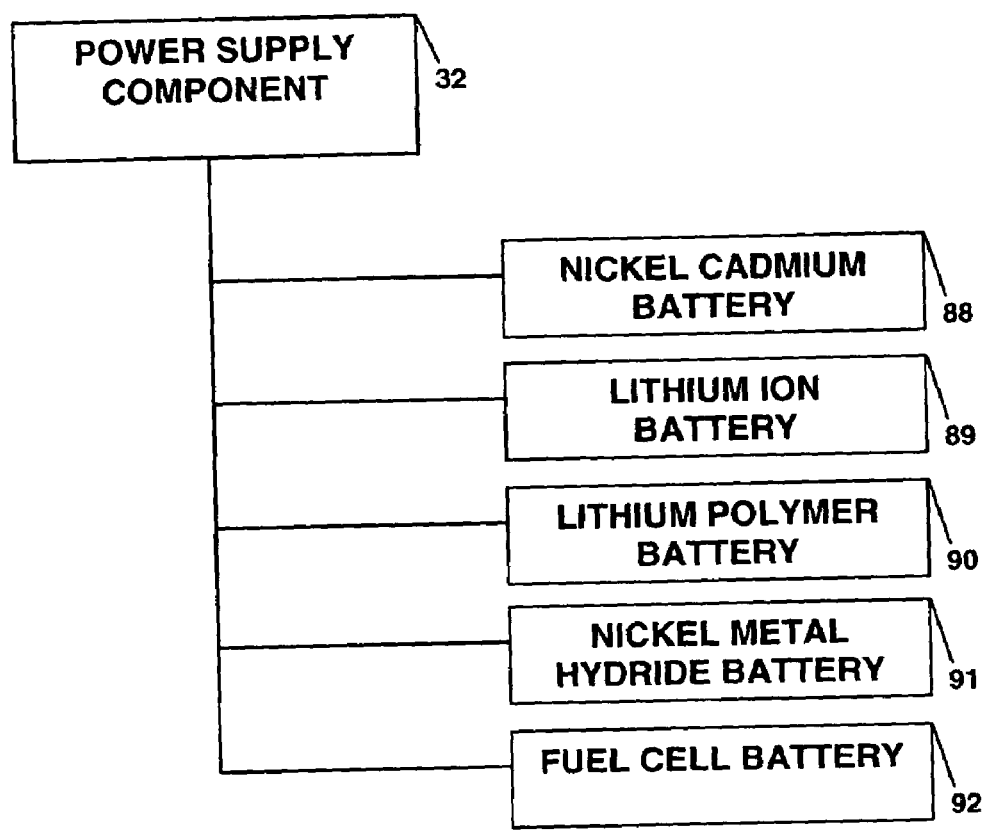
FIG. 26 shows embodiments of power supply component in accordance with claims 20 and 42 of present invention.

FIG. 26 shows embodiments of power supply component 32 in accordance with claim 2 of present invention. Power supply component 32 can be one of nickel cadmium battery 88, lithium ion battery 89, lithium polymer battery 90, nickel metal hydride battery 91, fuel cell battery 92.

Figure 27:
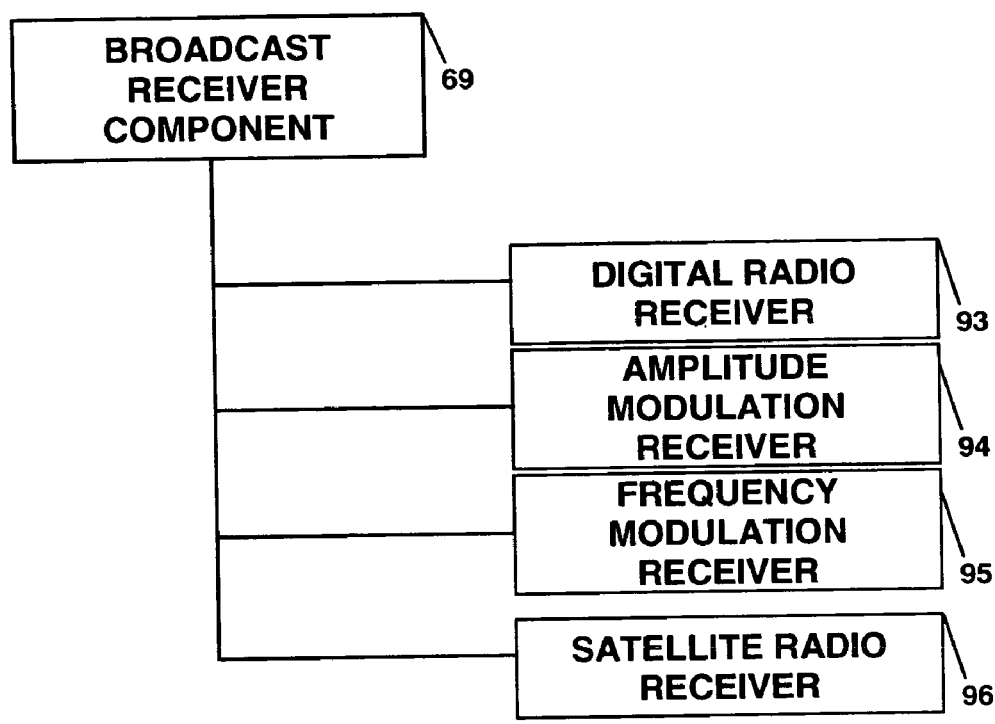
FIG. 27 shows embodiments of wireless audio broadcast receiver component in accordance with claims 21 and 43 of present invention.

FIG. 27 shows embodiments of broadcast receiver component 69 in accordance with claim 12 of present invention. Broadcast receiver component 69 can be one of digital radio broadcast receiver 93, amplitude modulation broadcast receiver 94, frequency modulation broadcast receiver 95, satellite radio broadcast receiver 96.

Figure 28:
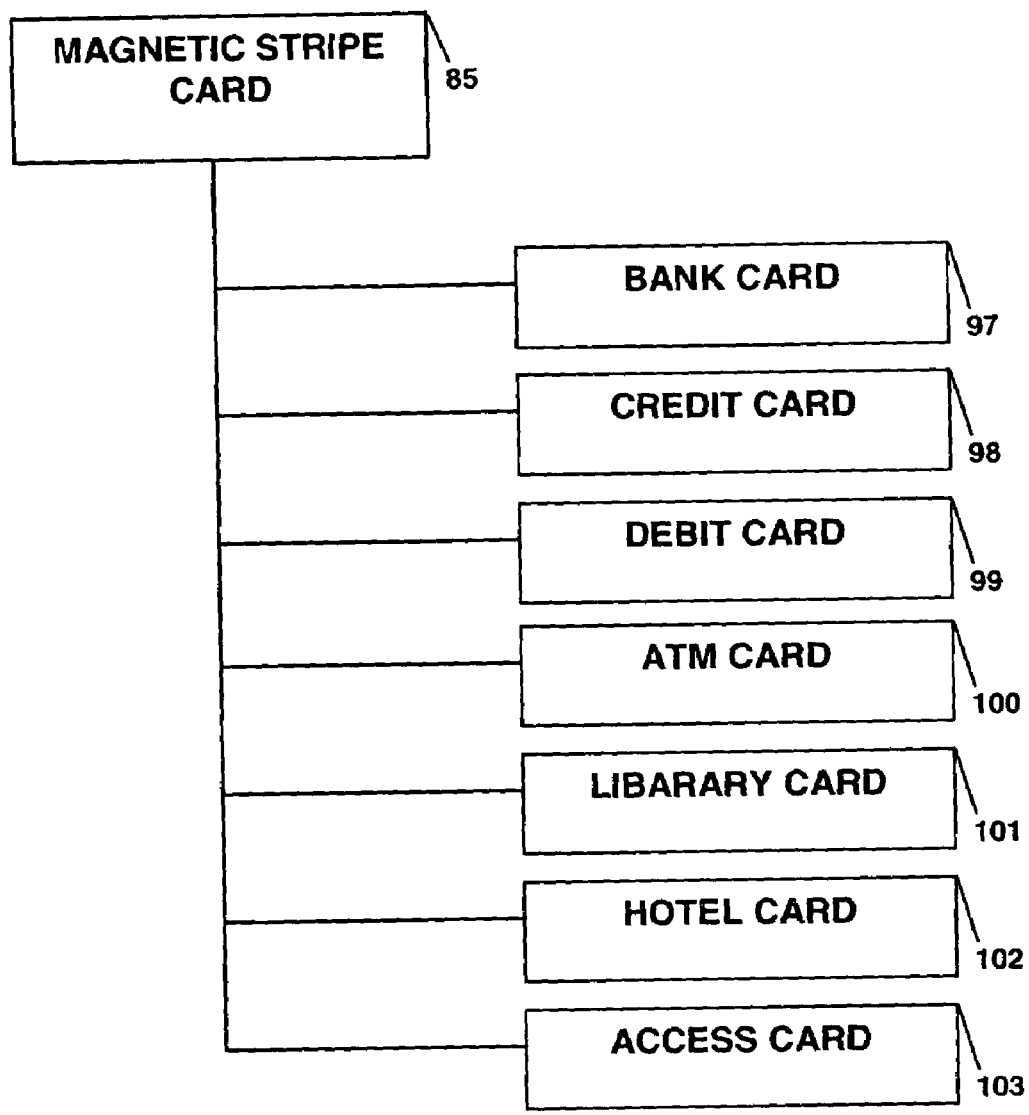
FIG. 28 shows embodiments of magnetic stripe based card in accordance with claims 22 and 44 of present invention.

FIG. 28 shows embodiments of magnetic stripe based card 85 in accordance with claim 18 of present invention. Magnetic stripe based card 85 can be one of bank card 97, credit card 98, debit card 99, automated teller machine card 100, library card 101, hotel card 102 and access card 103.

Figure 29:
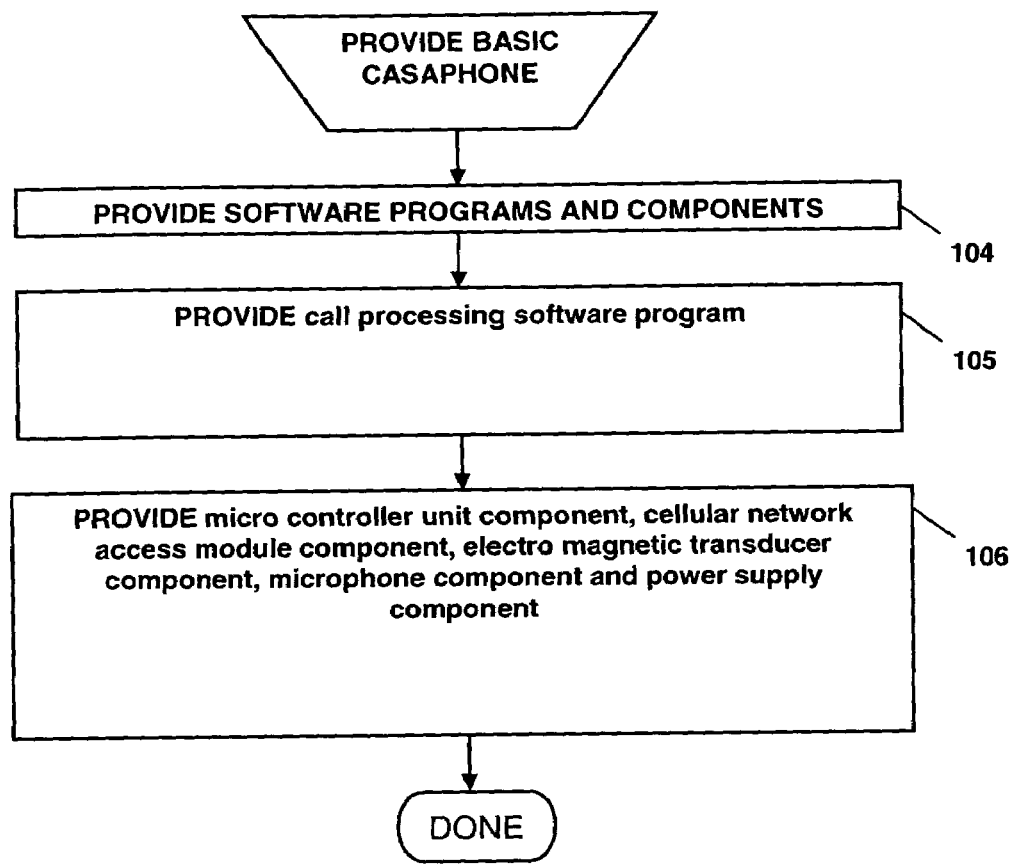
FIG. 29 shows a flow chart of method combining a basic cellular phone with the form factor of a conventional audio cassette in accordance with claim 23 of present invention.

FIG. 29 shows a flow chart of method to provide a hands free cellular phone system using basic casaphone 8 in accordance with claim 23 of present invention. In step 104, low end casaphone 10 is comprised with software programs 3 and components 2 to enable basic cellular phone functionality with hands free operation. In step 105, software programs 3 in low end casaphone 10 is comprised with call processing software program 11. In step 106, components 2 in low end casaphone 10 is comprised with micro controller unit component 5, cellular network access module component 12, electromagnetic transducer component 28, microphone component 18 and power supply component 32.

Figure 30:
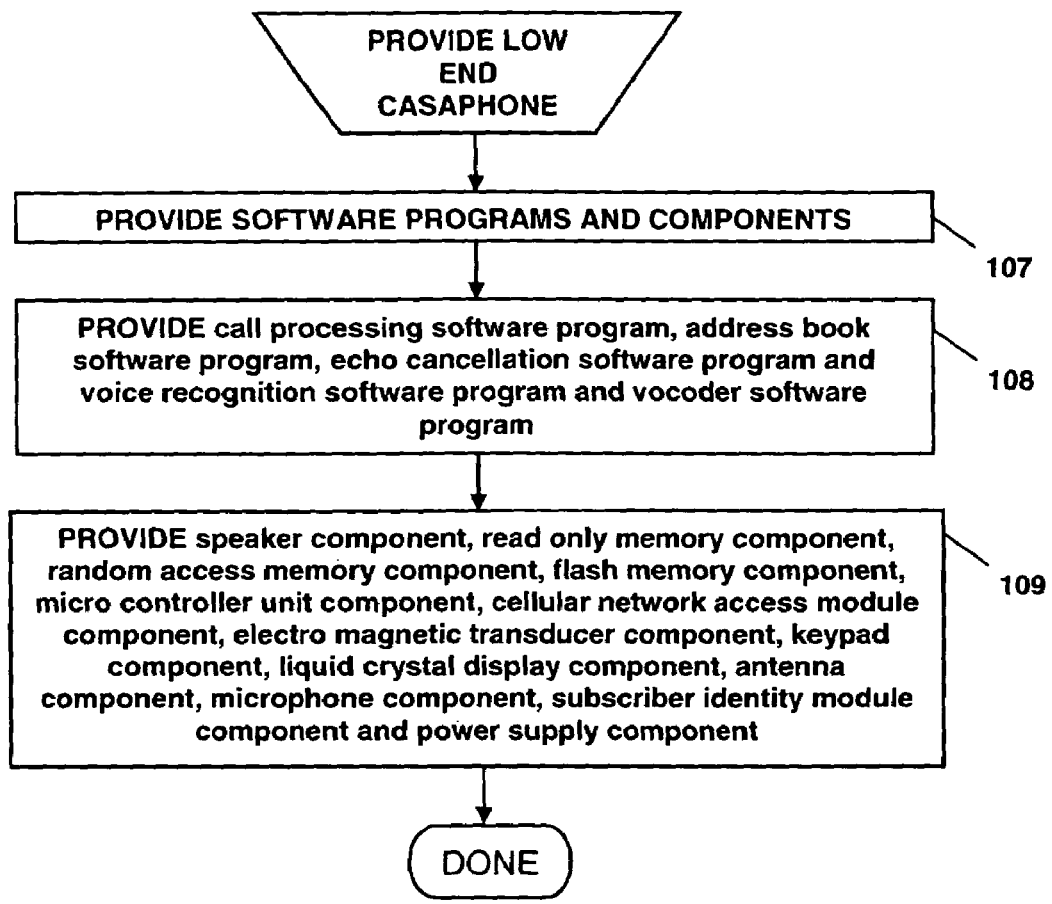
FIG. 30 shows a flow chart of method combining low end phone and form factor of a conventional audio cassette in accordance with claim 24 of present invention.

FIG. 30 shows a flow chart of method to provide a hands free cellular phone system using low end casaphone 10 in accordance with claim 24 of present invention. In step 107, low end casaphone 10 is comprised with software programs 3 and components 2 to enable basic cellular phone functionality with hands free operation. In step 108, software programs 3 in low end casaphone 10 is comprised with call processing software program 11, address book software program 13, echo cancellation software program 19, voice recognition software program 17 and vocoder software program 37. In step 109, components 2 in low end casaphone 10 is comprised with speaker component 20, read only memory component 23, random access memory component 16, flash memory component 14, micro controller unit component 5, cellular network access module component 12, electromagnetic transducer component 28, keypad component 29, liquid crystal display component 30, antenna component 31, microphone component 18, subscriber identity module component 15 and power supply component 32.

Figure 31:
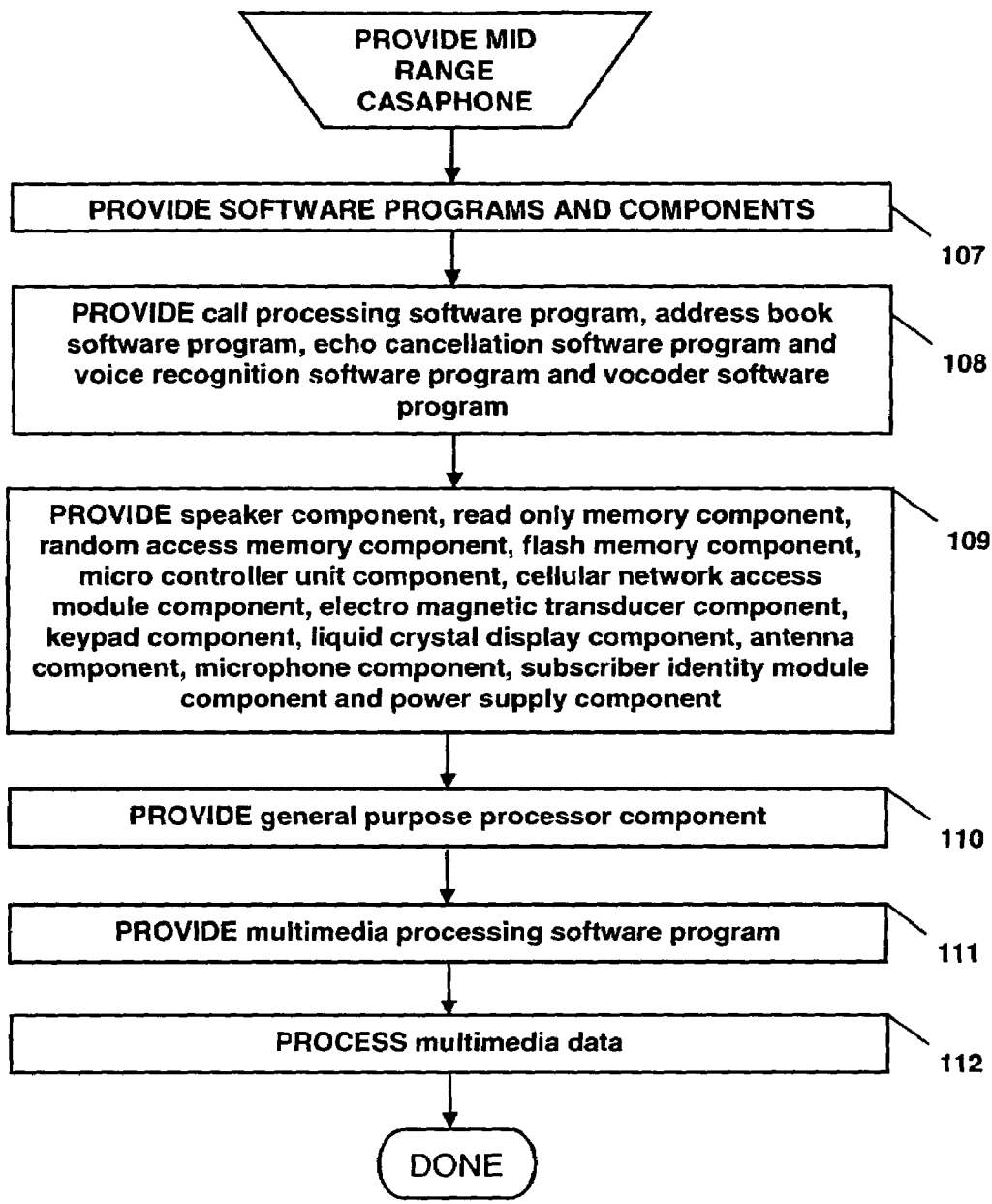
FIG. 31 shows a flow chart of method combining mid-range phone and form factor of a conventional audio cassette in accordance with claim 25 of present invention.

FIG. 31 shows a flow chart of method to provide a hands free cellular phone system using mid-range casaphone 42 in accordance with claim 25 of present invention. Mid-range casaphone 42 is an extension to low end casaphone 10. In step 110, a general purpose processor component 6 is added to enable executing general purpose instructions and basic digital signal processing functions multimedia processing. In step 111, multimedia processing software program 44 is also provided to execute general purpose instructions and basic digital signal processing functions for multimedia processing. In step 112, decoding of multimedia messages is done using general purpose processor component 6 and multimedia processing software program 44.

Figure 32:
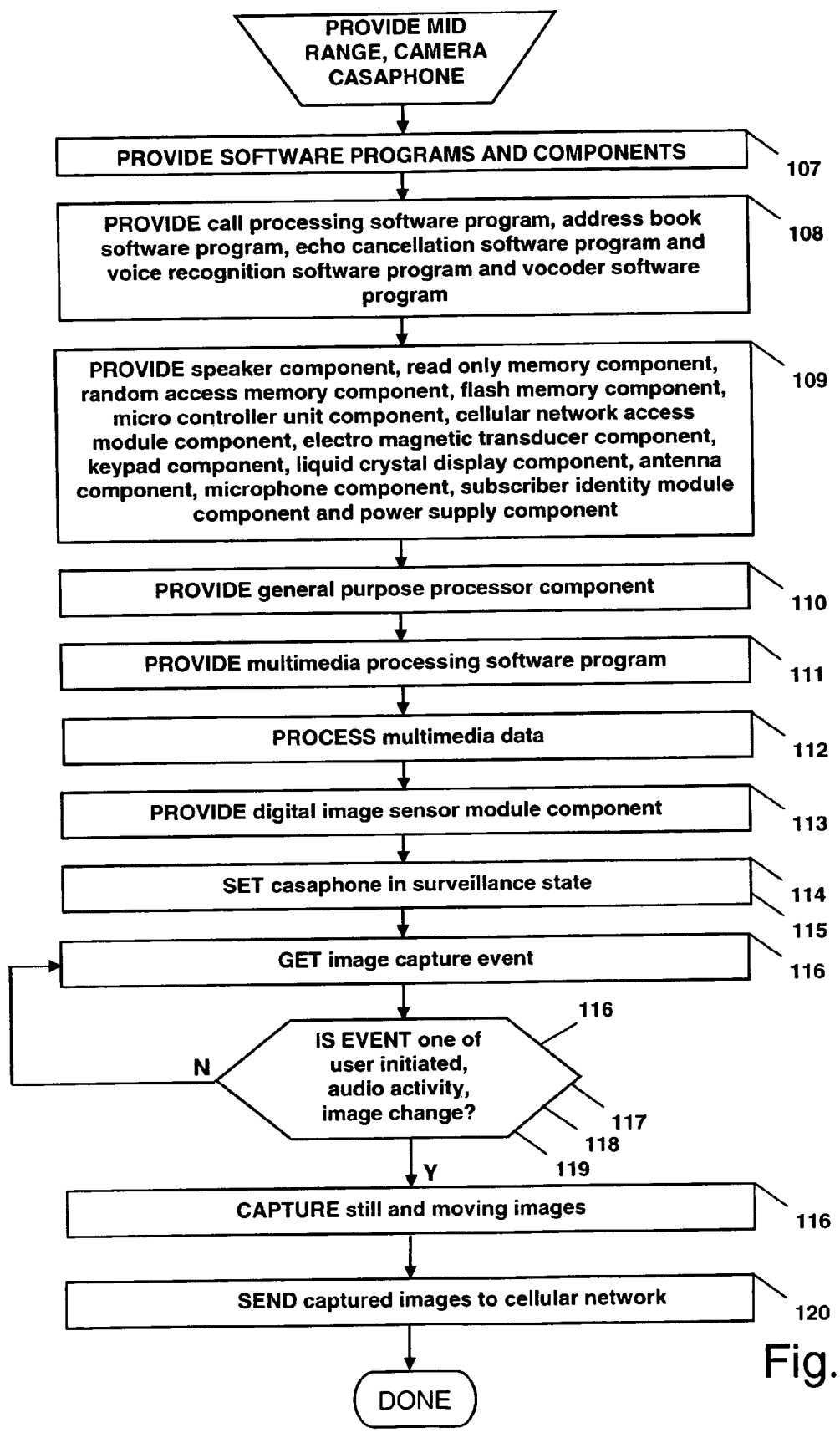
FIG. 32 shows a flow chart of method combining mid-range phone, a digital image sensor module component for remote monitoring and form factor of a conventional audio cassette in accordance with claim 26 of present invention.

FIG. 32 shows a flow chart of method to provide a hands free cellular phone system using mid-range camera enabled casaphone 46 in accordance with claim 26 of present invention. Mid-range camera enabled casaphone 46 is an extension to mid-range casaphone 42. Mid-range camera enabled casaphone 46 is used for surveillance purposes in this method. The step 113 provides digital image sensor module component 47 to enable capturing of still and moving images to transfer to cellular network 27. In step 114 mid-range camera enabled casaphone 46 is placed in surveillance state 115. In surveillance state 115, mid-range camera enabled casaphone 46, polls periodically for audio or image based input and then compares contiguous snapshots to detect any change. In step 116, images are captured because of three types of events comprising user initiated image capture event 117, audio activity detection triggered image capture event 118, contiguous image change detection triggered image capture event 119. User initiated image capture event 117 can be initiated from locally operating mid-range camera enabled casaphone 46 by using keypad component 29 or remotely operating mid-range camera enabled casaphone 46 using cellular access module component 12 and corresponding cellular network 27. Audio activity detection triggered image capture event 118 occurs when mid-range camera enabled casaphone 46 is placed in surveillance state 115 and contiguous audio snapshots detected through microphone component 18 are not identical. Contiguous image change detection triggered image capture event 119 occurs when mid-range camera enabled casaphone 46 is placed in surveillance state 115 and contiguous image snapshots detected through image sensor module component 47 are not identical. In step 120 still or moving images that are captured, are transferred to corresponding cellular network 27.

Figure 33:
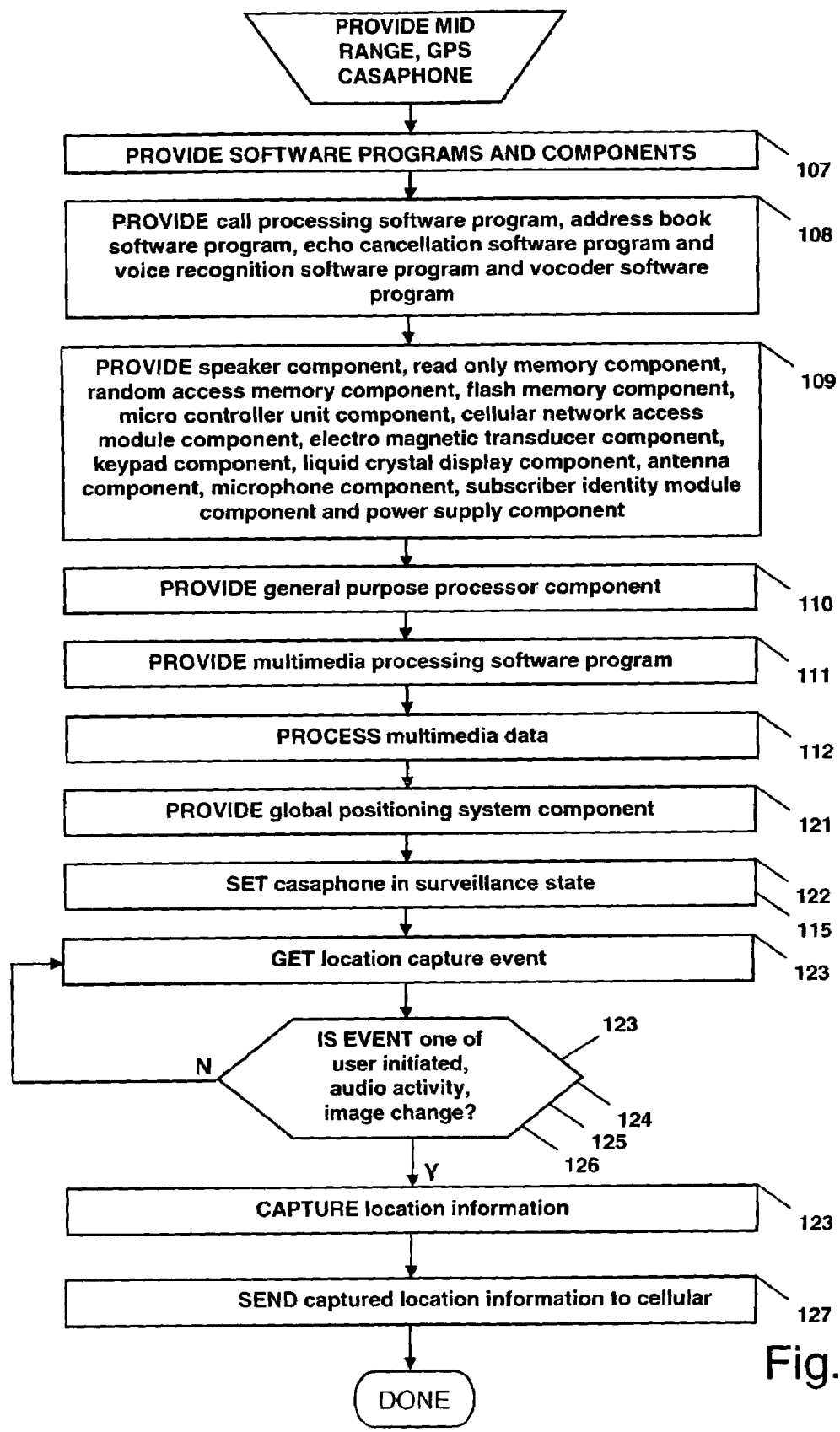
FIG. 33 shows a flow chart of method combining mid-range phone, a GPS component for notification services and form factor of a conventional audio cassette in accordance with claim 27 of present invention.

FIG. 33 shows a flow chart of method to provide a hands free cellular phone system using mid-range GPS enabled casaphone 48 in accordance with claim 27 of present invention. Mid-range GPS enabled casaphone 48 is an extension to mid-range casaphone 42. Mid-range GPS enabled casaphone 48 is used for surveillance purposes in this method. The step 121 provides GPS component 49 to enable location notification services. In step 122 mid-range GPS enabled casaphone 48 is placed in surveillance state 115. In surveillance state 115, mid-range GPS enabled casaphone 48, polls periodically for audio or image based input and then compares contiguous snapshots to detect any change. In step 123, location information is captured because of three types of events comprising user initiated location capture event 124, audio activity detection triggered location capture event 125, contiguous image change detection triggered location capture event 126. User initiated location capture event 124 can be initiated from locally operating mid-range GPS enabled casaphone 48 by using keypad component 29 or remotely operating mid-range GPS enabled casaphone 48 using cellular access module component 12 and corresponding cellular network 27. Audio activity detection triggered location capture event 125 occurs when mid-range GPS enabled casaphone 48 is placed in surveillance state 115 and contiguous audio snapshots detected through microphone component 18 are not identical. Contiguous image change detection triggered location capture event 126 occurs when mid-range GPS enabled casaphone 48 is placed in surveillance state 115 and contiguous image snapshots detected through image sensor module component 47 are not identical. In step 127 location information that is captured, is transferred to corresponding cellular network 27.

Figure 34:
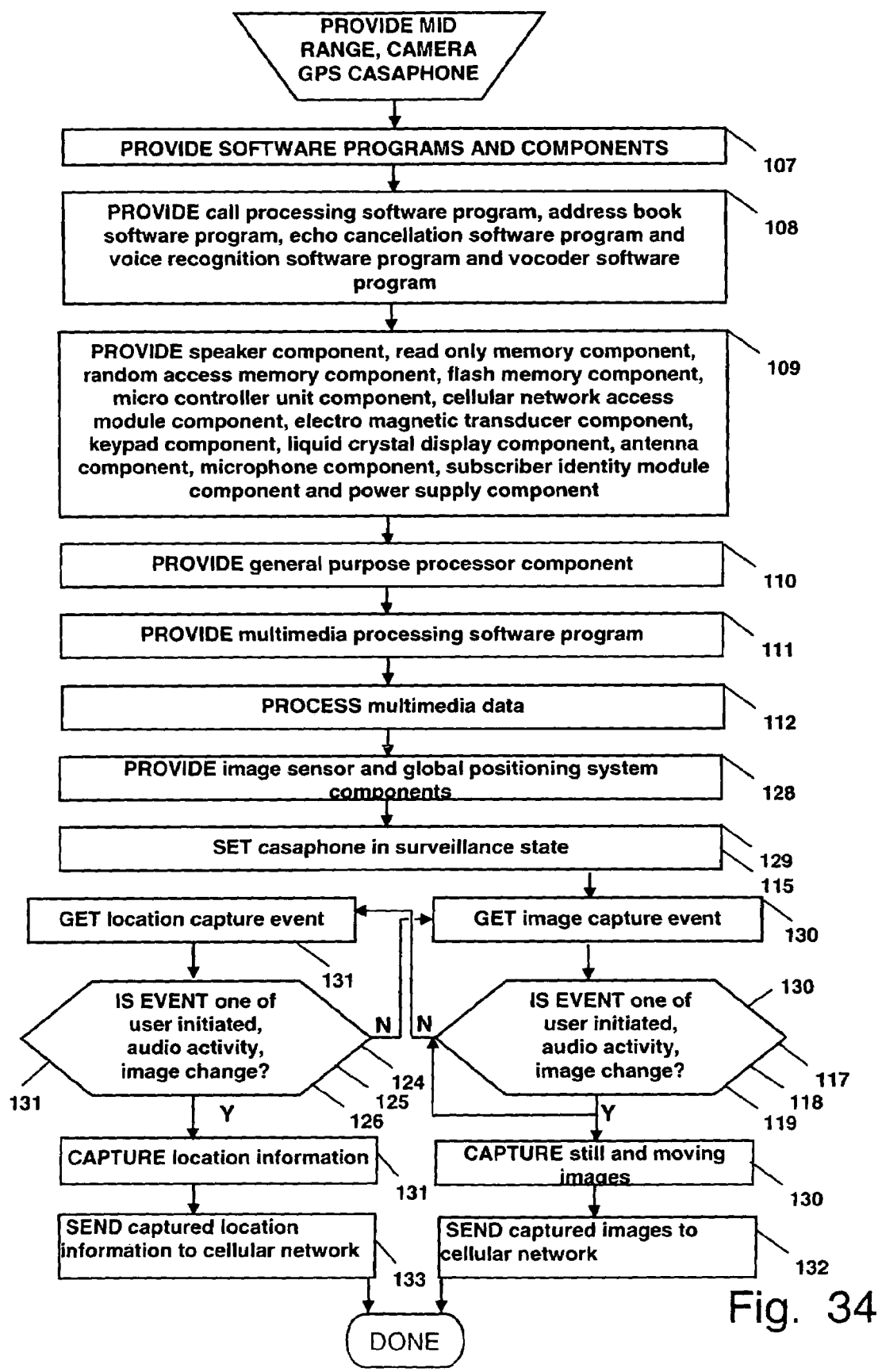
FIG. 34 shows a flow chart of method combining mid-range phone, a digital image sensor module component for remote monitoring, a GPS component for tracking services and form factor of a conventional audio cassette in accordance with claim 28 of present invention.

FIG. 34 shows a flow chart of method to provide a hands free cellular phone system using mid-range camera and GPS enabled casaphone 50 in accordance with claim 28 of present invention. Mid-range camera and GPS enabled casaphone 50 is an extension to mid-range casaphone 42. Mid-range camera and GPS enabled casaphone 50 is used for surveillance purposes in this method. The step 128 provides image sensor module component 47 and GPS component 49 to enable location notification and remote monitoring services. In step 129 mid-range camera and GPS enabled casaphone 50 is placed in surveillance state 115. In surveillance state 115, mid-range camera and GPS enabled casaphone 50 polls periodically for audio or image based input and then compares contiguous snapshots to detect any change. In step 130, images are captured because of three types of events comprising user initiated image capture event 117, audio activity detection triggered image capture event 118, contiguous image change detection triggered image capture event 119.

User initiated image capture event 117 can be initiated from locally operating mid-range camera and GPS enabled casaphone 50 by using keypad component 29 or remotely operating mid-range camera and GPS enabled casaphone 50 using cellular access module component 12 and corresponding cellular network 27. Audio activity detection triggered image capture event 118 occurs when mid-range camera and GPS enabled casaphone 50 is placed in surveillance state 115 and contiguous audio snapshots detected through microphone component 18 are not identical. Contiguous image change detection triggered image capture event 119 occurs when mid-range camera and GPS enabled casaphone 50 is placed in surveillance state 115 and contiguous image snapshots detected through image sensor module component are not identical.

In step 131, location information is captured because of three types of events comprising user initiated location capture event 124, audio activity detection triggered location capture event 125, contiguous image change detection triggered location capture event 126. User initiated location capture event 124 can be initiated from locally operating mid-range camera and GPS enabled casaphone 50 by using keypad component 29 or remotely operating mid-range camera and GPS enabled casaphone 50 using cellular access module component 12 and corresponding cellular network 27. Audio activity detection triggered location capture event 125 occurs when mid-range camera and GPS enabled casaphone 50 is placed in surveillance state 115 and contiguous audio snapshots detected through microphone component 18 are not identical. Contiguous image change detection triggered location capture event 126 occurs when mid-range camera and GPS enabled casaphone 50 is placed in surveillance state 115 and contiguous image snapshots detected through image sensor module component 47 are not identical. In step 132 still or moving images that are captured, are transferred to corresponding cellular network 27. In step 133 location information that is captured, is transferred to corresponding cellular network 27.

Figure 35:
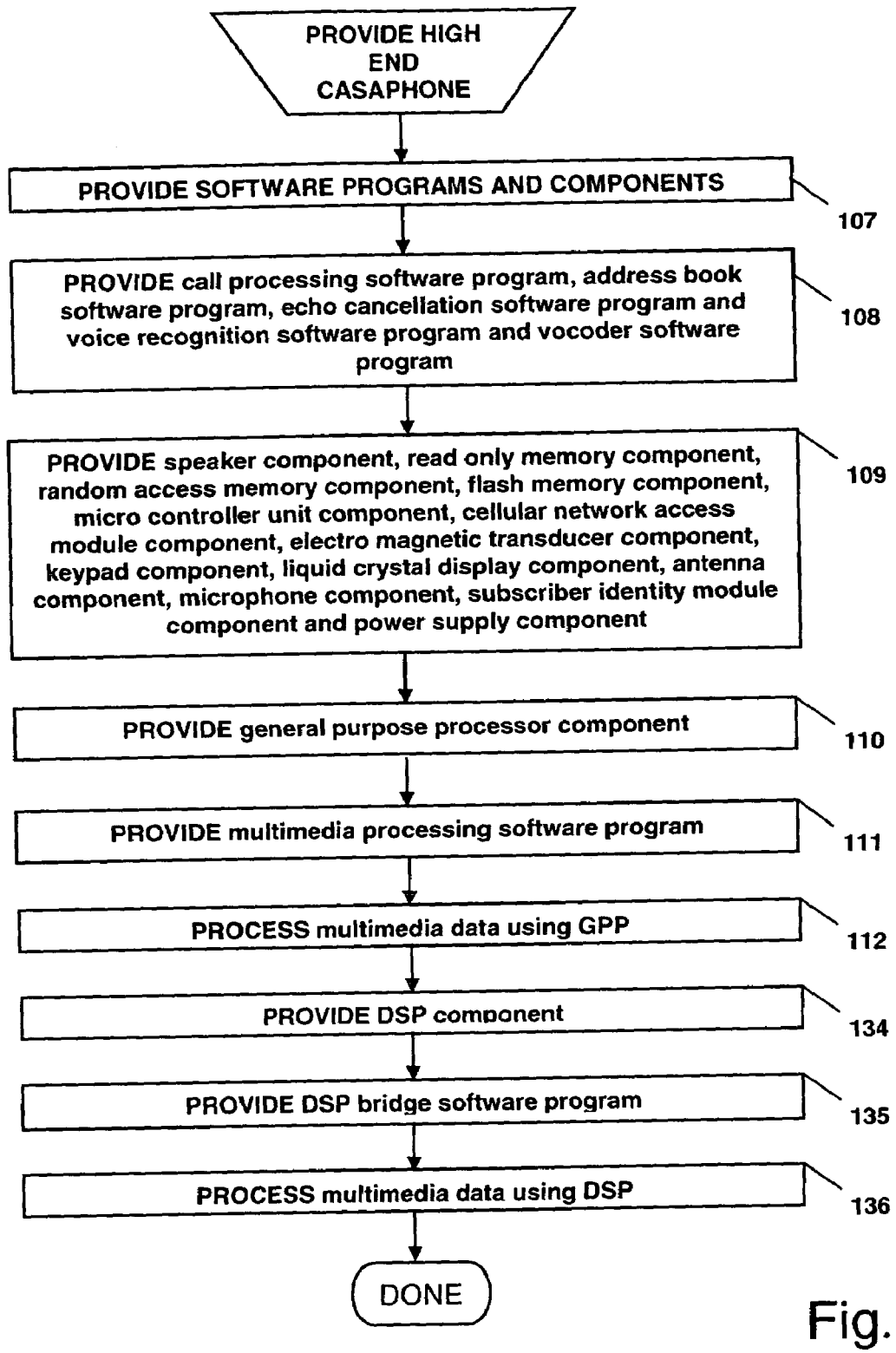
FIG. 35 shows a flow chart of method combining high end phone and form factor of a conventional audio cassette in accordance with claim 29 of present invention.

FIG. 35 shows a flow chart of method to provide a hands free cellular phone system using high end casaphone 51 in accordance with claim 29 of present invention. High end casaphone 51 is an extension to mid-range casaphone 42. In step 134, a digital signal processor component 7 is provided to enable advanced multimedia applications such as music encoding and decoding and digital signal processor component 7 is connected to general purpose processor component 6 using digital signal processor bridge hardware connectivity 52. In step 135, communication between general purpose processor component 6 and digital signal processor component 7 utilizes digital signal processor bridge protocol software program 53 which uses digital signal processor bridge hardware connectivity 52. In step 136, processing of multimedia data is done using multimedia processing software program 44 that can be executed on either one or both of general purpose processor component 6 and digital signal processor component 7.

Figure 36:
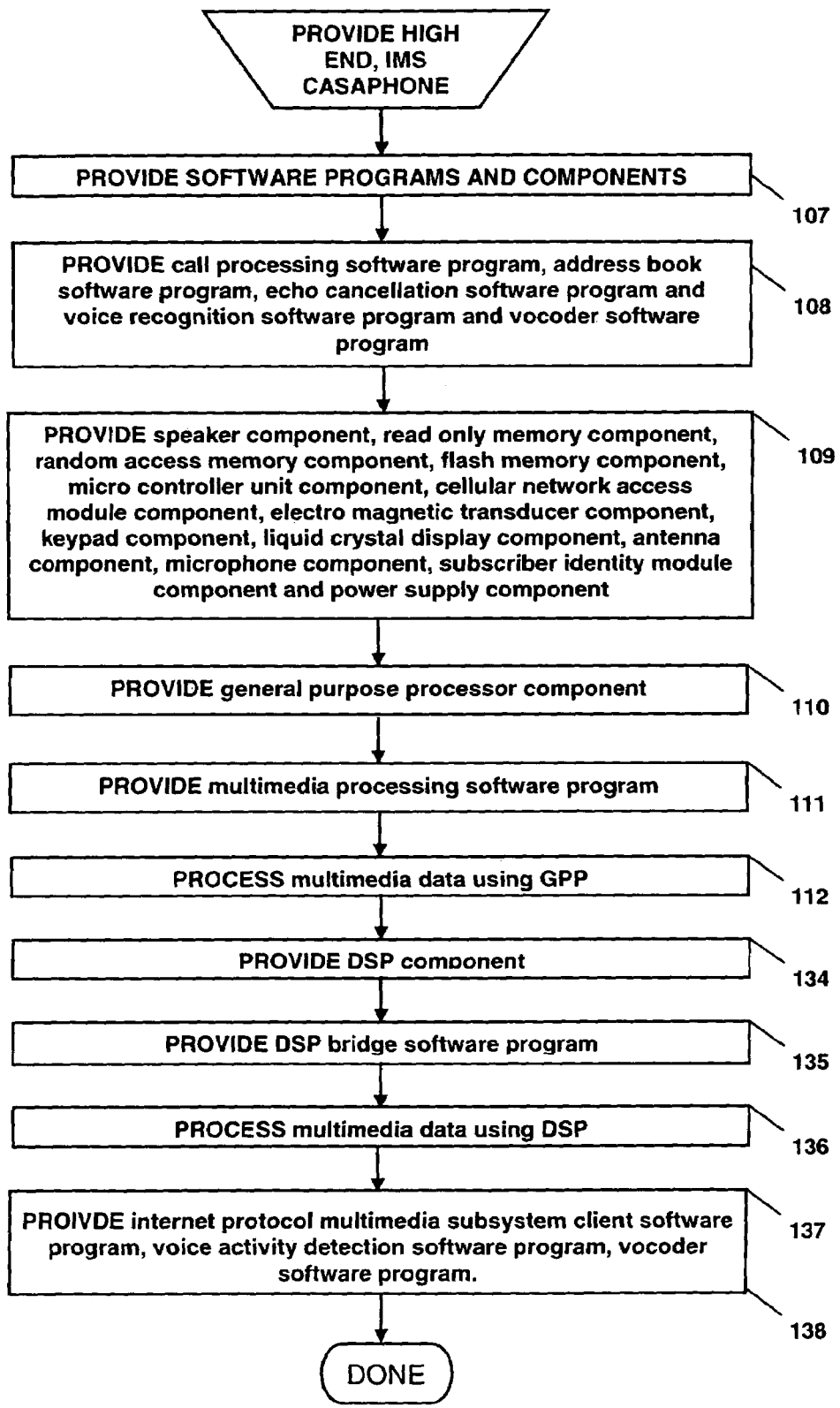
FIG. 36 shows a flow chart of method combining high end phone, and internet protocol multimedia subsystem client software program in accordance with claim 30 of present invention.

FIG. 36 shows a flow chart of method to provide a hands free cellular phone system using high end IMS enabled casaphone 55 in accordance with claim 30 of present invention. High end IMS enabled casaphone 55 is an extension to high end casaphone 51. High end IMS enabled casaphone 55 is used to provide real time interactive multimedia applications such as push to talk, voice over internet protocol. The step 137 provides additional software programs comprising internet protocol multimedia subsystem client software program 56, voice activity detection software program 59, and vocoder software program 37. Internet protocol multimedia subsystem client software program 56 enables setting up an IMS session 138 that enables real time interactive applications. Vocoder software program 37 enables decoding and encoding of voice samples. Voice activity detection software program 59 enables controlling flow of voice into IMS session 138.

Figure 37:
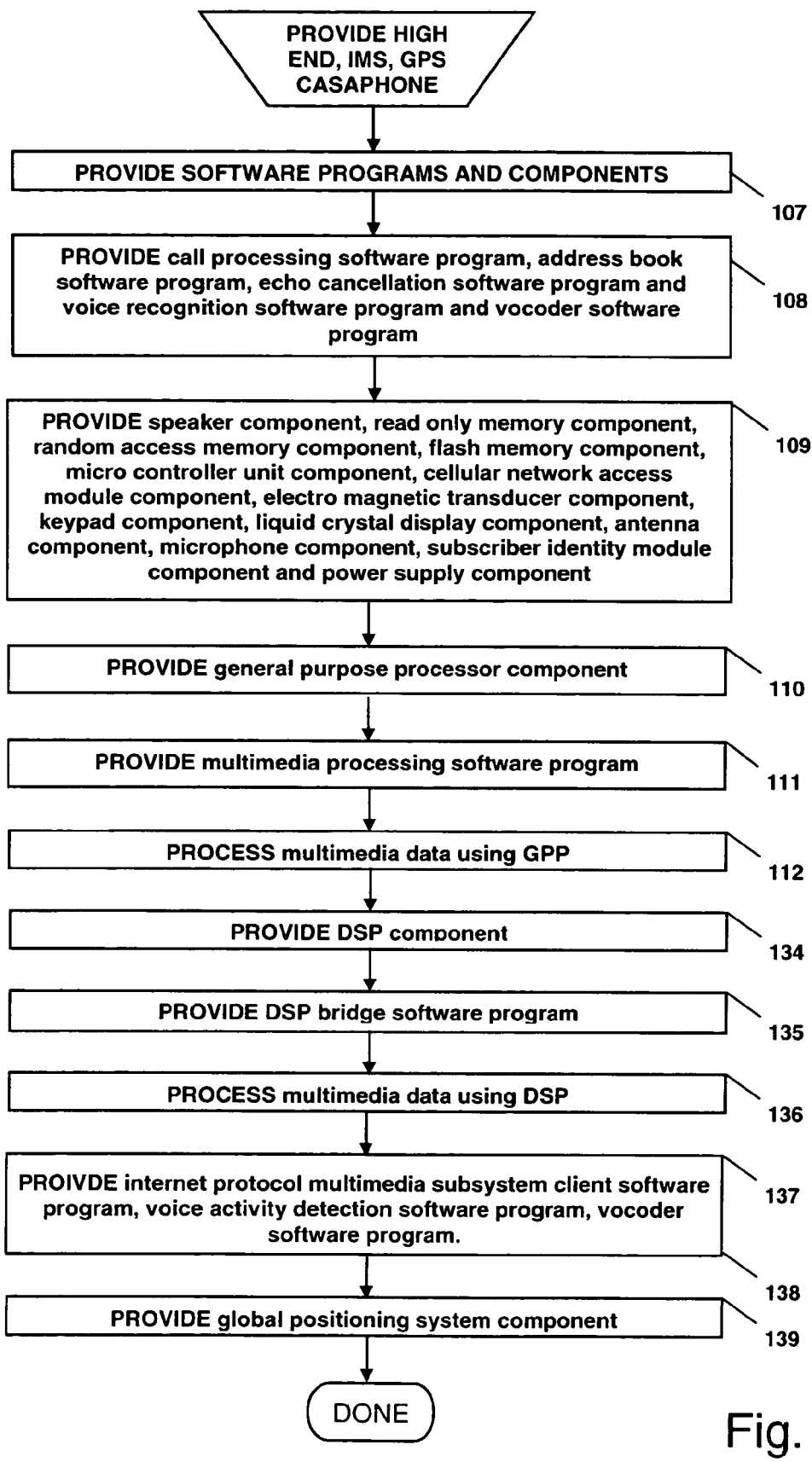
FIG. 37 shows a flow chart of method combining high end phone, internet protocol multimedia subsystem client software program and a GPS component in accordance with claim 31 of present invention.

FIG. 37 shows a flow chart of method to provide a hands free cellular phone system using high end, IMS and GPS enabled casaphone 60 in accordance with claim 31 of present invention. High end, IMS and GPS enabled casaphone 60 is an extension to high end IMS enabled casaphone 55. High end, IMS and GPS enabled casaphone 60 is used to provide location based services and navigation capabilities. The step 139 provides GPS component 49.

By combining internet protocol multimedia subsystem client software program 56 and location information from GPS component 49, any new real time interactive location based services may be implemented.

Figure 38:
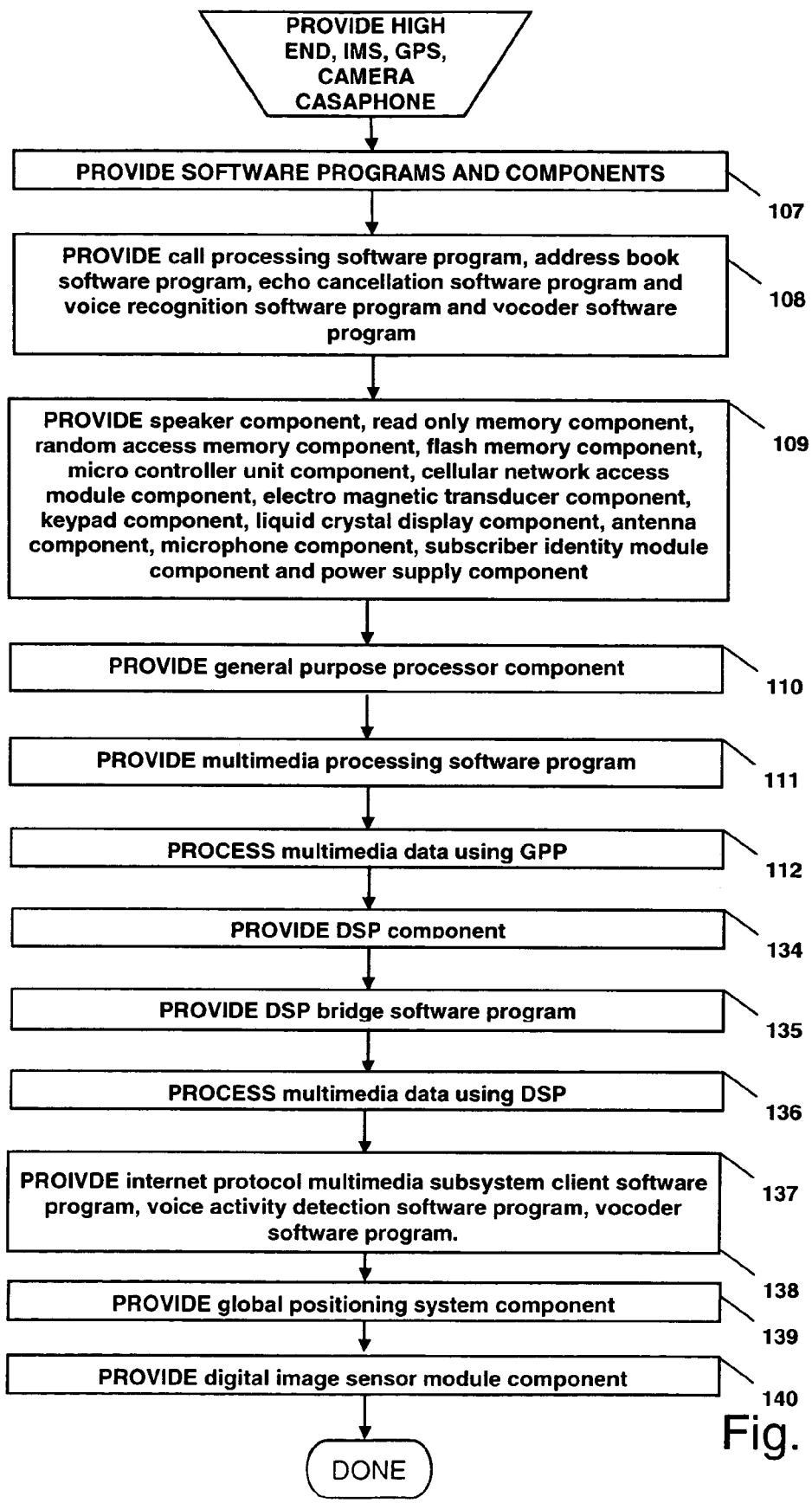
FIG. 38 shows a flow chart of method combining high end phone, internet protocol multimedia subsystem client software program, GPS component and a digital image sensor module component in accordance with claim 32 of present invention.

FIG. 38 shows a flow chart of method to provide a hands free cellular phone system using high end, IMS, GPS and camera enabled casaphone 61 in accordance with claim 32 of present invention. High end, IMS, GPS and camera enabled casaphone 61 is an extension to high end, IMS and GPS enabled casaphone 60. High end, IMS, GPS and camera enabled casaphone 61 is used to provide real time real time interactive monitoring and tracking services. The step 140 provides digital image sensor module component 47 to enable capturing of still and moving images to transfer to cellular network 27.

By combining internet protocol multimedia subsystem client software program 56, location information from GPS component 49 and digital image sensor module component 47, it is possible to implement any new real time real time interactive monitoring and tracking services.

Figure 39:
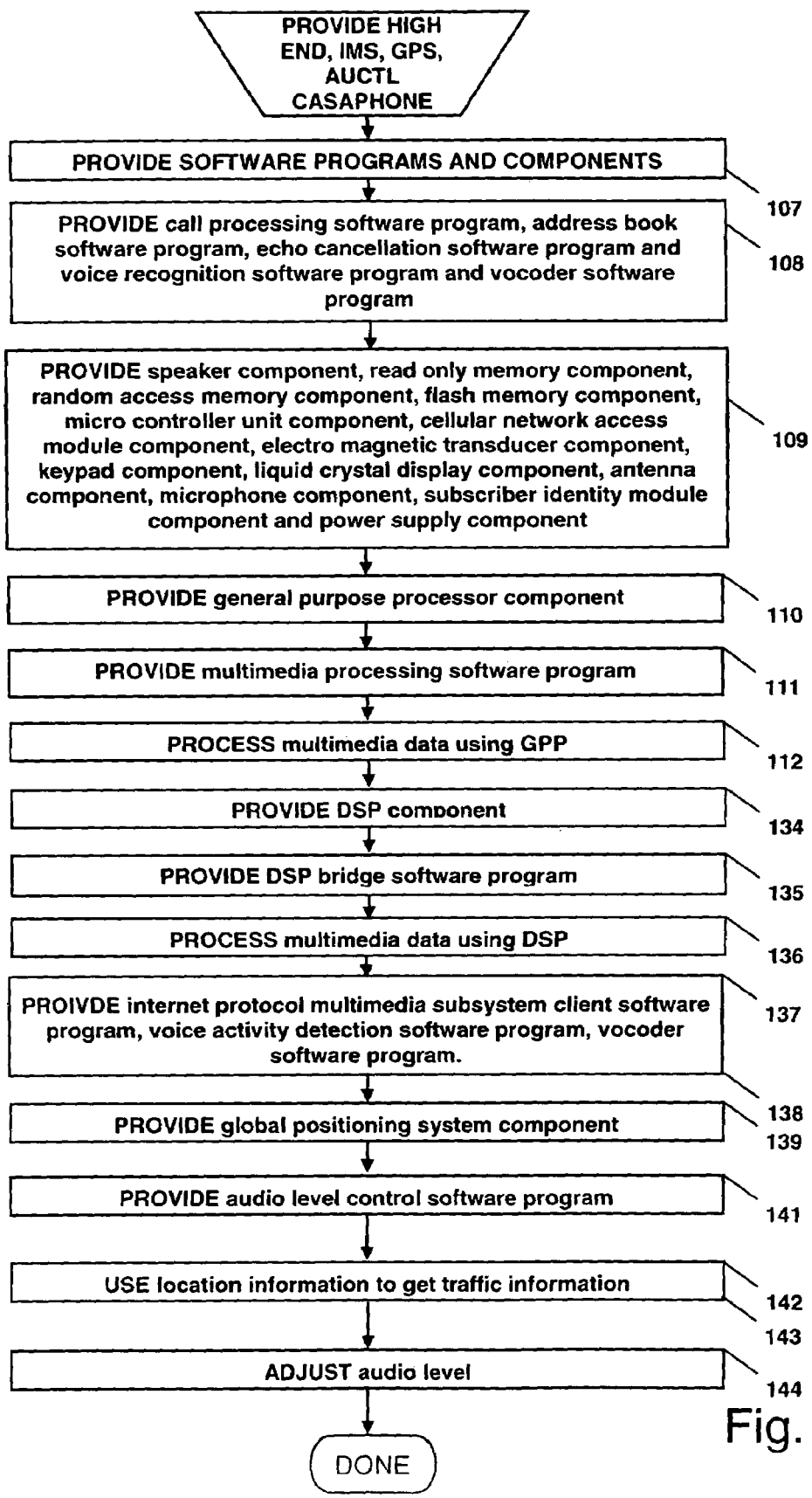
FIG. 39 shows a flow chart of method combining high end phone, GPS component and audio control software program in accordance with claim 33 of present invention.

FIG. 39 shows a flow chart of method to provide a hands free cellular phone system using high end, IMS, GPS and audio level control software program enabled casaphone 62 in accordance with claim 33 of present invention. High end, IMS, GPS and audio level control software program enabled casaphone 62 is an extension to high end, IMS and GPS enabled casaphone 60. High end, IMS, GPS and audio level control software program enabled casaphone 62 is used to provide real time interactive audio control based on driving conditions. The step 141 provides audio level control software program to enable automatic controlling of volume levels of audio output from said device based on driving conditions. The step 142 uses location information from GPS component 49 and uses internet protocol multimedia subsystem client software program 56 to get real time traffic conditions 143 and controls audio output based on unfavorable conditions. The step 144 controls audio based on real time traffic conditions 143.

Figure 40:
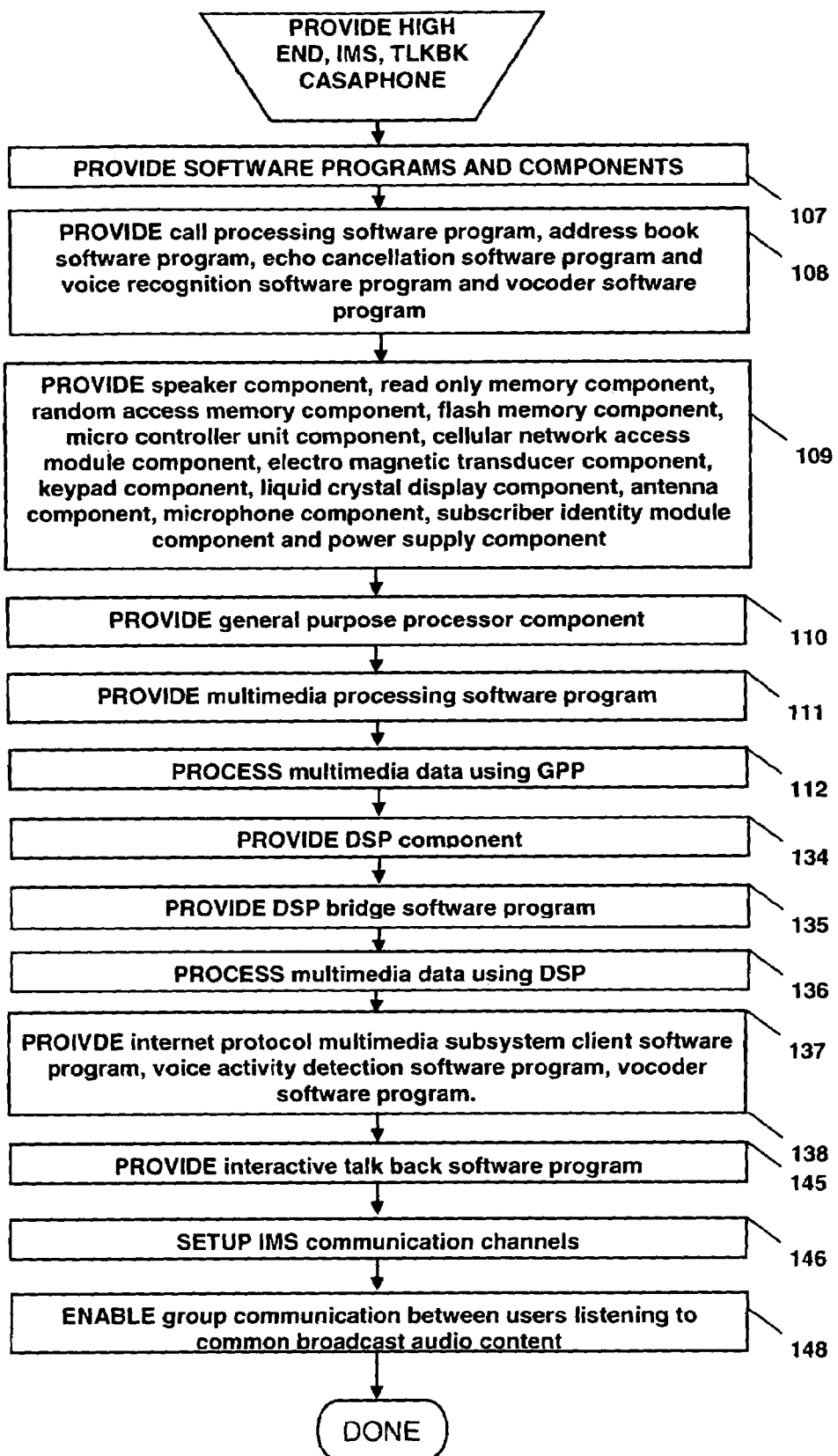
FIG. 40 shows a flow chart of method combining high end phone, internet protocol multimedia subsystem client software program, and interactive talk back software program in accordance with claim 34 of present invention.

FIG. 40 shows a flow chart of method to provide a hands free cellular phone system using high end, IMS and talk back software program enabled casaphone 64 in accordance with claim 34 of present invention. High end, IMS and talk back software program enabled casaphone 64 is an extension to high end IMS enabled casaphone 55. High end, IMS and talk back software program enabled casaphone 64 is used to enable conversation to a group of participants with common interest such as commercial broadcast audio content using internet protocol multimedia subsystem software program 56. In step 145 interactive talk back software program is provided. In step 146 internet protocol multimedia subsystem group communication channels 147 are setup based on audio content and time of broadcast. In step 148 group communication between users listening to common broadcast audio content during a certain period of time is setup using group communication channel 147 is enabled. Audio broadcast content and corresponding broadcast times are downloaded to high end, IMS and talk back software program enabled casaphone 64 using internet protocol multimedia subsystem software program 56.

Figure 41:
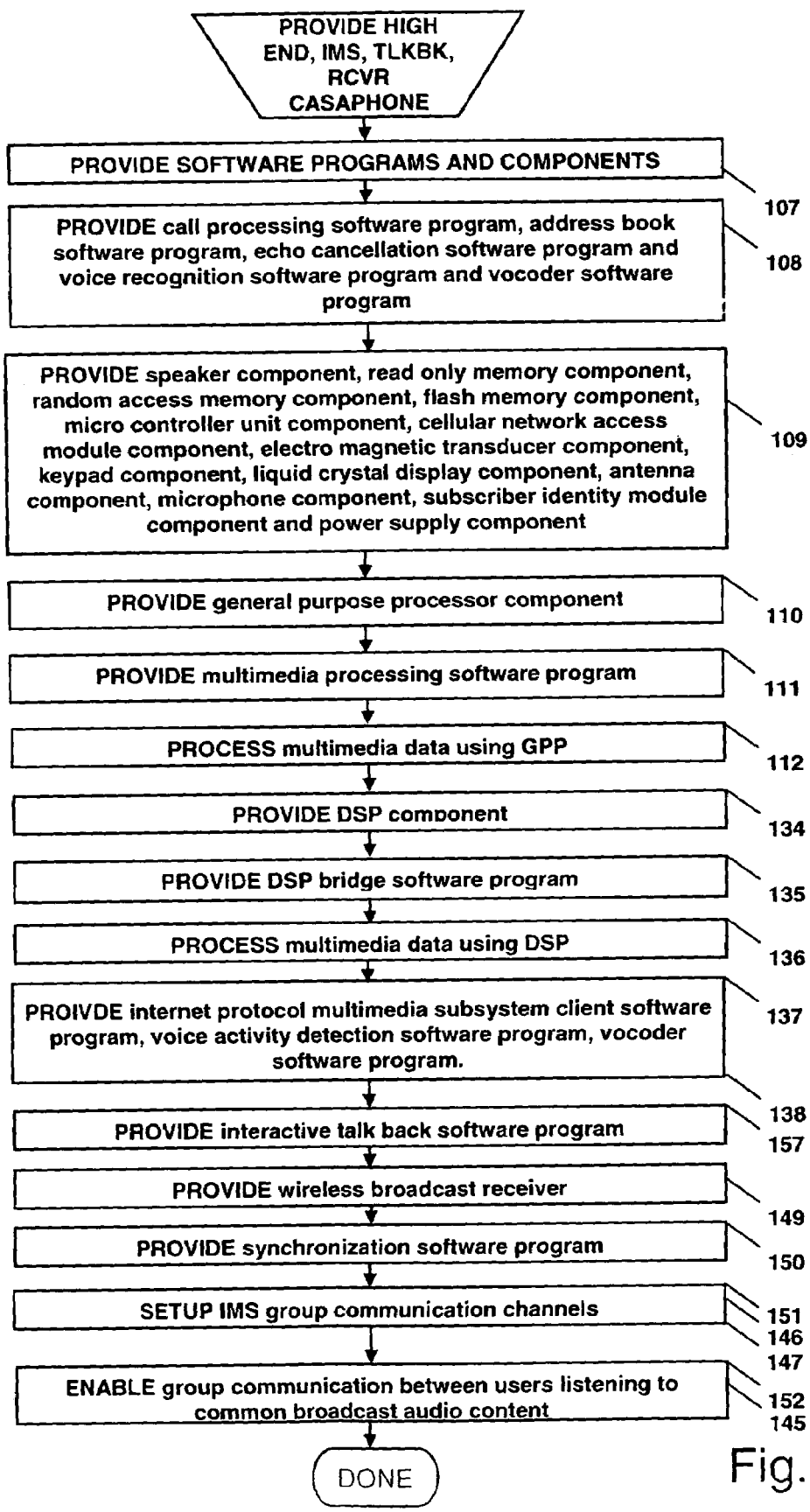
FIG. 41 shows a flow chart of method combining high end phone, internet protocol multimedia subsystem client software program, interactive talk back software program and wireless audio broadcast receiver in accordance with claim 35 of present invention.

FIG. 41 shows a flow chart of method to provide a hands free cellular phone system using high end, IMS, talk back software program and broadcast receiver enabled casaphone 68 in accordance with claim 35 of present invention. High end, IMS, talk back software program and broadcast receiver enabled casaphone 68 is an extension to high end IMS and talk back software program enabled casaphone 64. High end, IMS, talk back software program and broadcast receiver enabled casaphone 68 enables group oriented real time interactive chat services. In step 149, a wireless audio broadcast receiver component 69 to receive audio content using commercial broadcast radio channels is provided. In step 150 synchronization software program 70 is provided to automatically create dynamic chat groups based on audio content that is received in wireless audio broadcast receiver component 69.

In step 151 internet protocol multimedia subsystem group communication channels 147 are setup based on grouping information from wireless audio broadcast receiver component 69 and corresponding audio content. In step 152 group communication between users listening to common broadcast audio content is setup using group communication channel 147. Some commercial broadcast radio channels 67 received in wireless audio broadcast receiver component 69 have metadata channel 71 which is used to broadcast metadata about audio content being broadcast 73. This metadata 73 is used by synchronization software program 70 to create dynamic chat groups 74. This metadata 73 could denote subgroups associated with audio content and can be created dynamically on a need by basis by audio content broadcaster.

Figure 42:
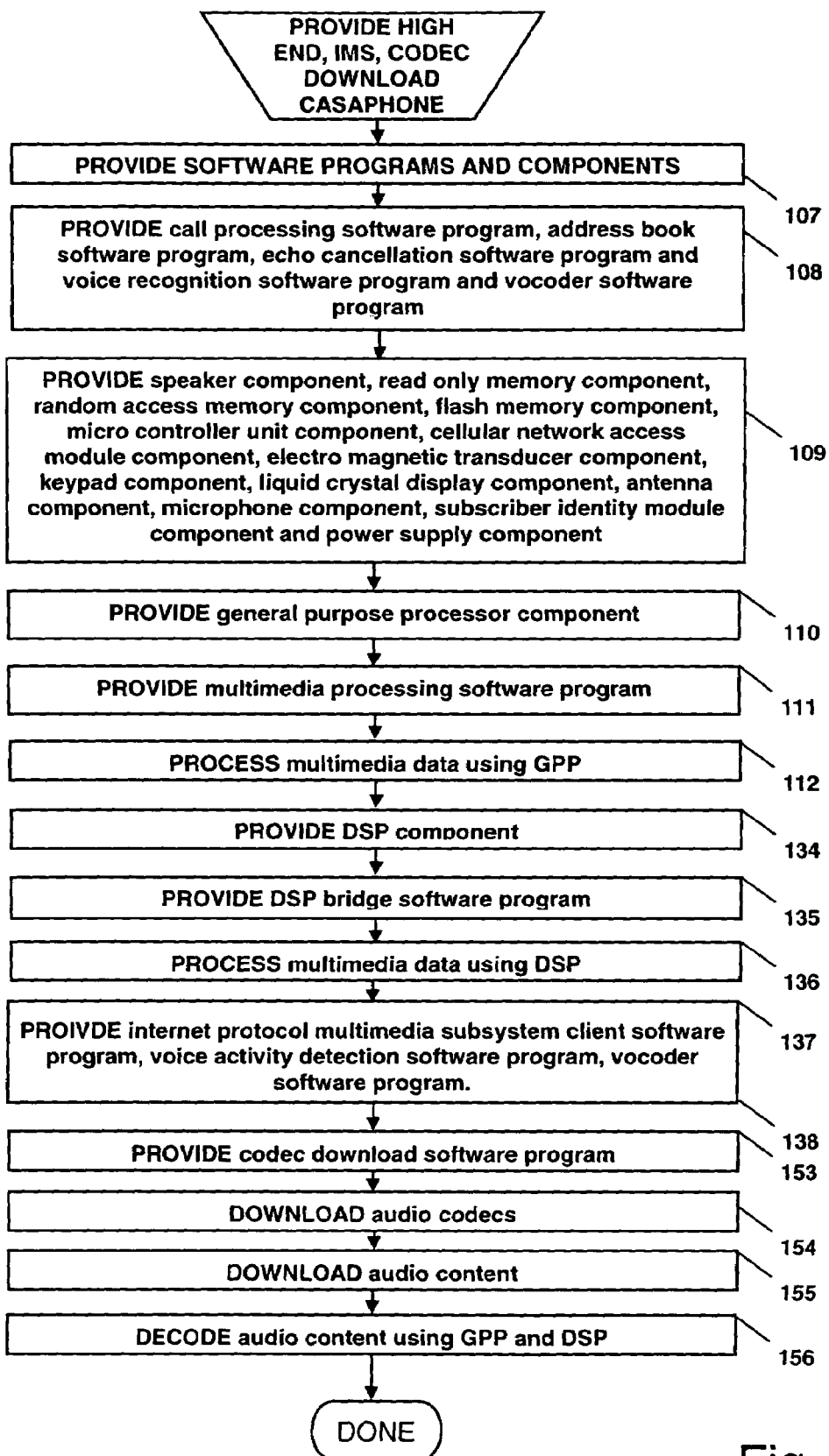
FIG. 42 shows a flow chart of method combining high end phone, internet protocol multimedia subsystem client software program and codec download software program in accordance with claim 36 of present invention.

FIG. 42 shows a flow chart of method to provide a hands free cellular phone system using high end, IMS and codec download software program enabled casaphone 75 in accordance with claim 36 of present invention. High end, IMS and codec download software program enabled casaphone 75 is an extension to high end IMS enabled casaphone 55. High end, IMS and codec download software program enabled casaphone 75 is used to enable real time audio streaming applications such as internet radio. In step 153 interactive codec download software program is provided. In step 154 audio codecs 54 corresponding to audio content are downloaded. In step 155 audio content is downloaded. In step 156 audio content downloaded is decoded using audio codecs 54 and digital signal processor 7 and general purpose processor 6 and played out using speaker component 20 in high end, IMS and codec download software program enabled casaphone 75 or electromagnetic transducer 28 of high end, IMS and codec download software program enabled casaphone 75 which may be coupled to electromagnetic transducer of conventional audio cassette player 35.

Figure 43:
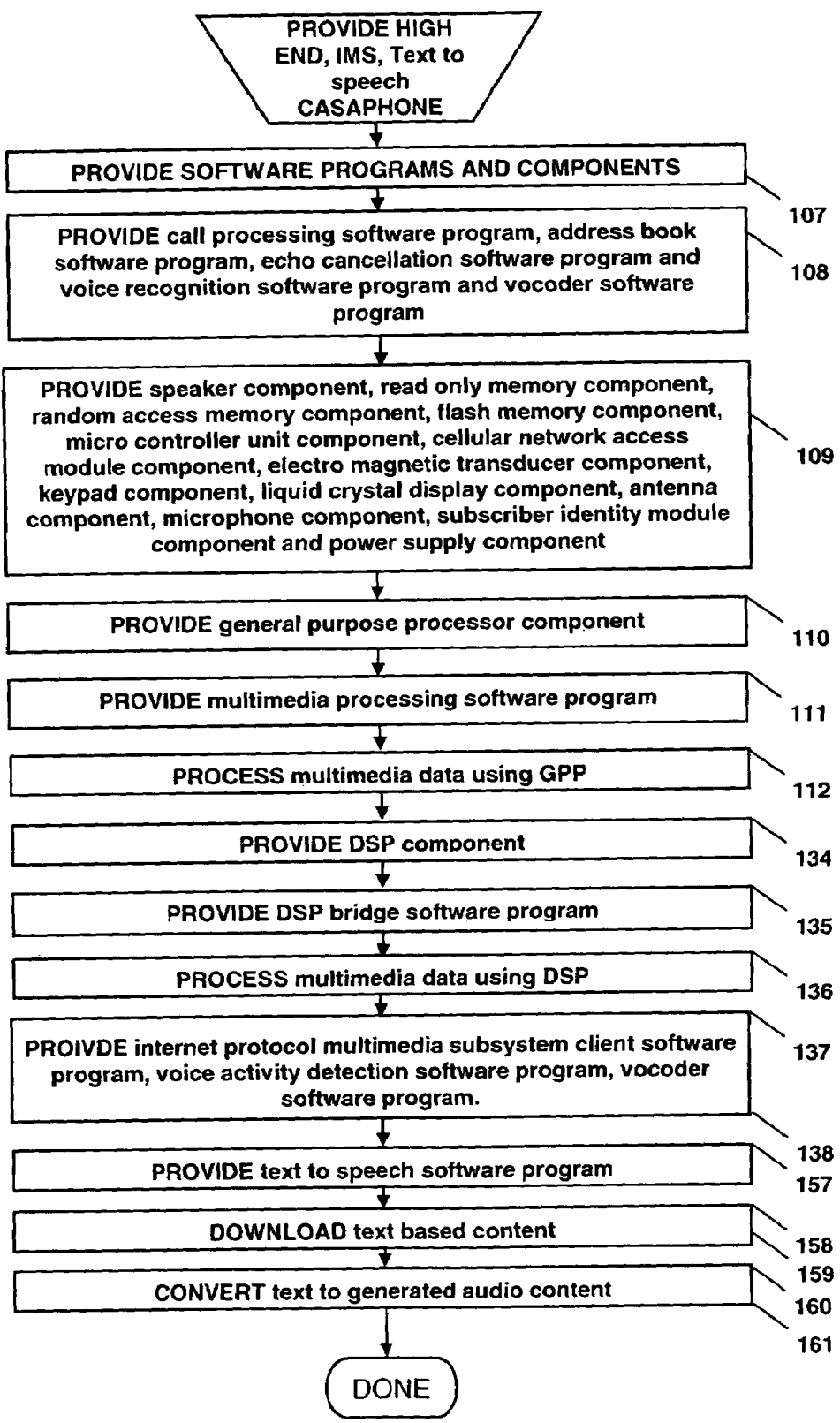
FIG. 43 shows a flow chart of method combining high end phone, internet protocol multimedia subsystem client software program and text to speech conversion software program in accordance with claim 37 of present invention.

FIG. 43 shows a flow chart of method to provide a hands free cellular phone system using high end, IMS and text to speech conversion software program enabled casaphone 77 in accordance with claim 37 of present invention. High end, IMS and text to speech conversion software program enabled casaphone 77 is an extension to high end IMS enabled casaphone 55. High end, IMS and text to speech conversion software program enabled casaphone 77 is used to enable real time interactive text to speech applications such as on demand news clips. In step 157 text to speech conversion software program 78 is provided. In step 158 text based content 159 is downloaded using internet protocol multimedia subsystem client software program 56. In step 160 downloaded text based content 159 is converted to generated audio content 161 using text to speech conversion software program 78, digital signal processor 7 and general purpose processor 6 and then the generated audio content 161 is played out using speaker component 20 in high end, IMS and text to speech program enabled casaphone 77 or electromagnetic transducer 28 of high end, IMS and text to speech conversion software program enabled casaphone 77 which is coupled to electromagnetic transducer of conventional audio cassette player 35.

Figure 44:
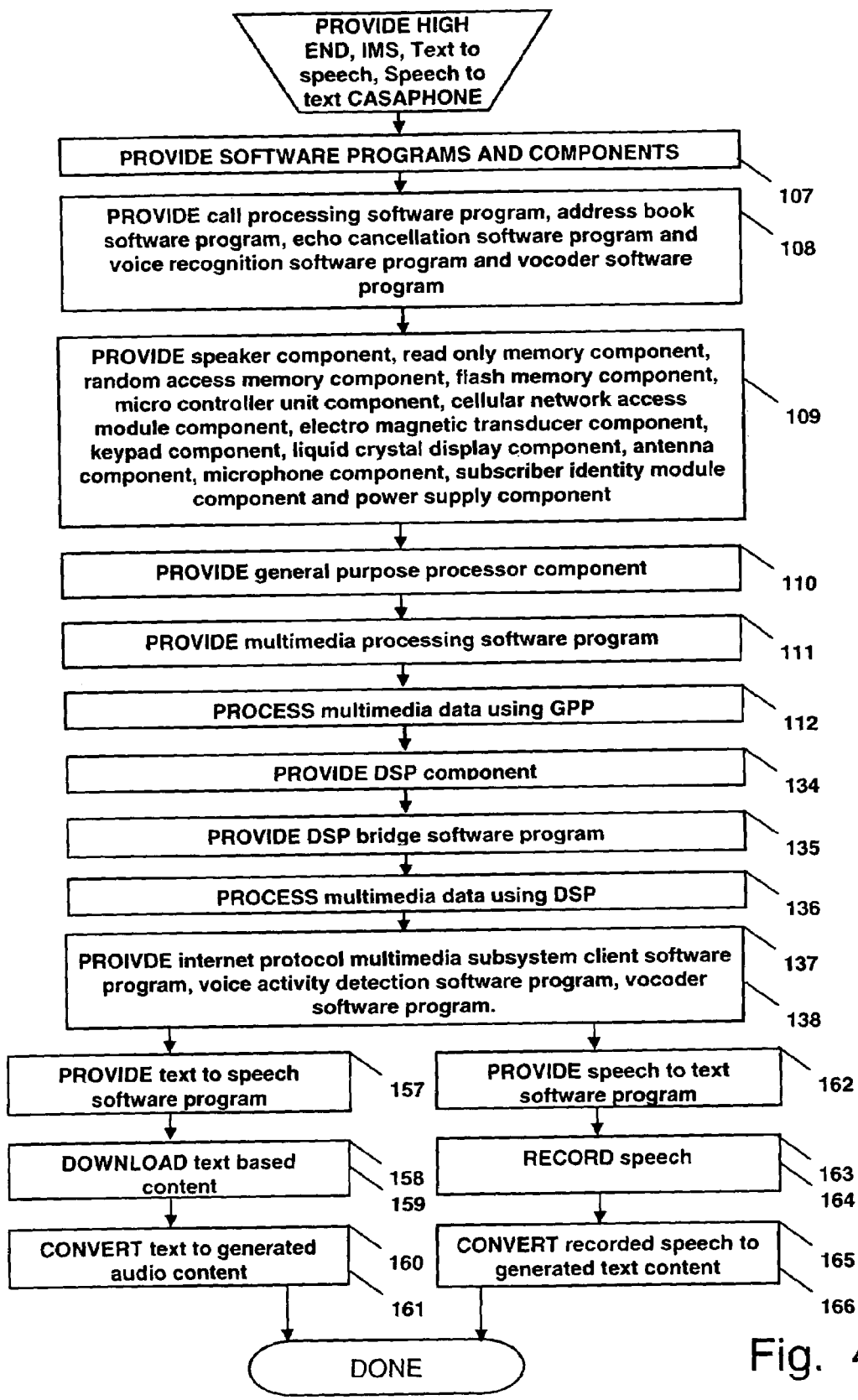
FIG. 44 shows a flow chart of method combining high end phone, internet protocol multimedia subsystem client software program, text to speech conversion software program and speech to text conversion software program in accordance with claim 38 of present invention.

FIG. 44 shows a flow chart of method to provide a hands free cellular phone system using high end, IMS, text to speech conversion software program and speech to text conversion software program enabled casaphone 79 in accordance with claim 38 of present invention. High end, IMS, text to speech conversion software program and speech to text conversion software program enabled casaphone 79 is an extension to high end IMS and text to speech software program enabled casaphone 77. High end, IMS, text to speech conversion software program and speech to text conversion software program enabled casaphone 79 is used interactive multimodal applications such as interactive storybooks with content being delivered as inter mixed audio, voice and text data. In step 162 speech to text conversion software program 80 is provided. In step 163 recording of speech originating from microphone 18 of high end, IMS, text to speech conversion software program and speech. to text conversion software program enabled casaphone 79 is done to produce recorded speech samples 164. In step 165 recorded speech samples 164 are converted to generated text content 166 using speech to text conversion software program 80, digital signal processor 7 and general purpose processor 6 and then the generated text content 166 is transferred to cellular network 27 using internet protocol multimedia subsystem client software program 56.

Figure 45:
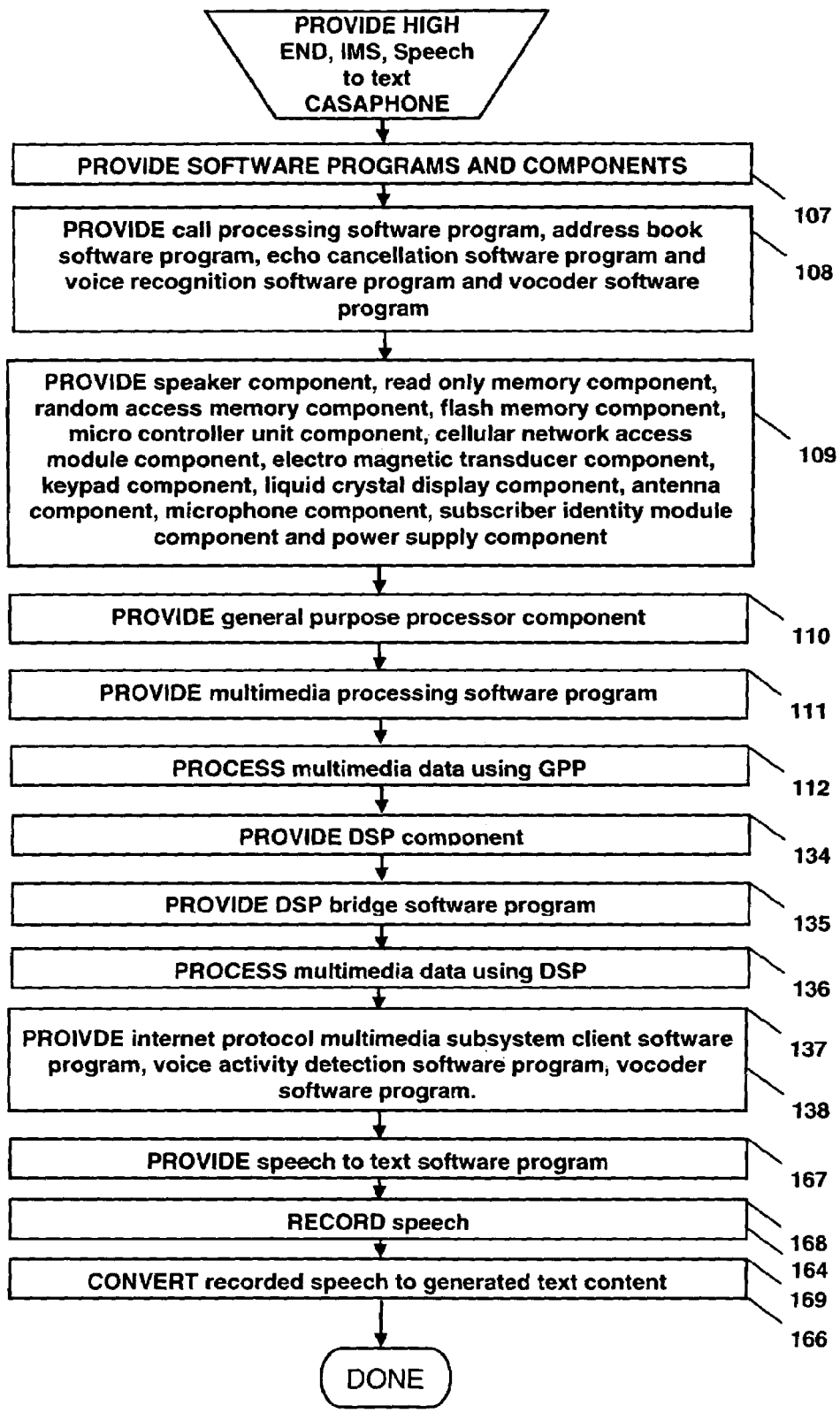
FIG. 45 shows a flow chart of method combining high end phone, internet protocol multimedia subsystem client software program and speech to text conversion software program in accordance with claim 39 of present invention.

FIG. 45 shows a flow chart of method to provide a hands free cellular phone system using high end, IMS and speech to text conversion software program enabled casaphone 81 in accordance with claim 39 of present invention. High end, IMS and speech to text conversion software program enabled casaphone 81 is an extension to high end IMS enabled casaphone 55. High end, IMS and speech to text conversion software program enabled casaphone 81 is used to enable real time interactive speech to text applications such as voice browsing and voice based email. In step 167 speech to text conversion software program 80 is provided. In step 168 recording of speech originating from microphone 18 of high end, IMS and speech to text conversion software program enabled casaphone 81 is done to produce recorded speech samples 164. In step 169 recorded speech samples 164 is converted to generated text content 166 using speech to text conversion software program 80, digital signal processor 7 and general purpose processor 6 and then the generated text content 166 is transferred to cellular network 27 using internet protocol multimedia subsystem client software program 56.

Figure 46:
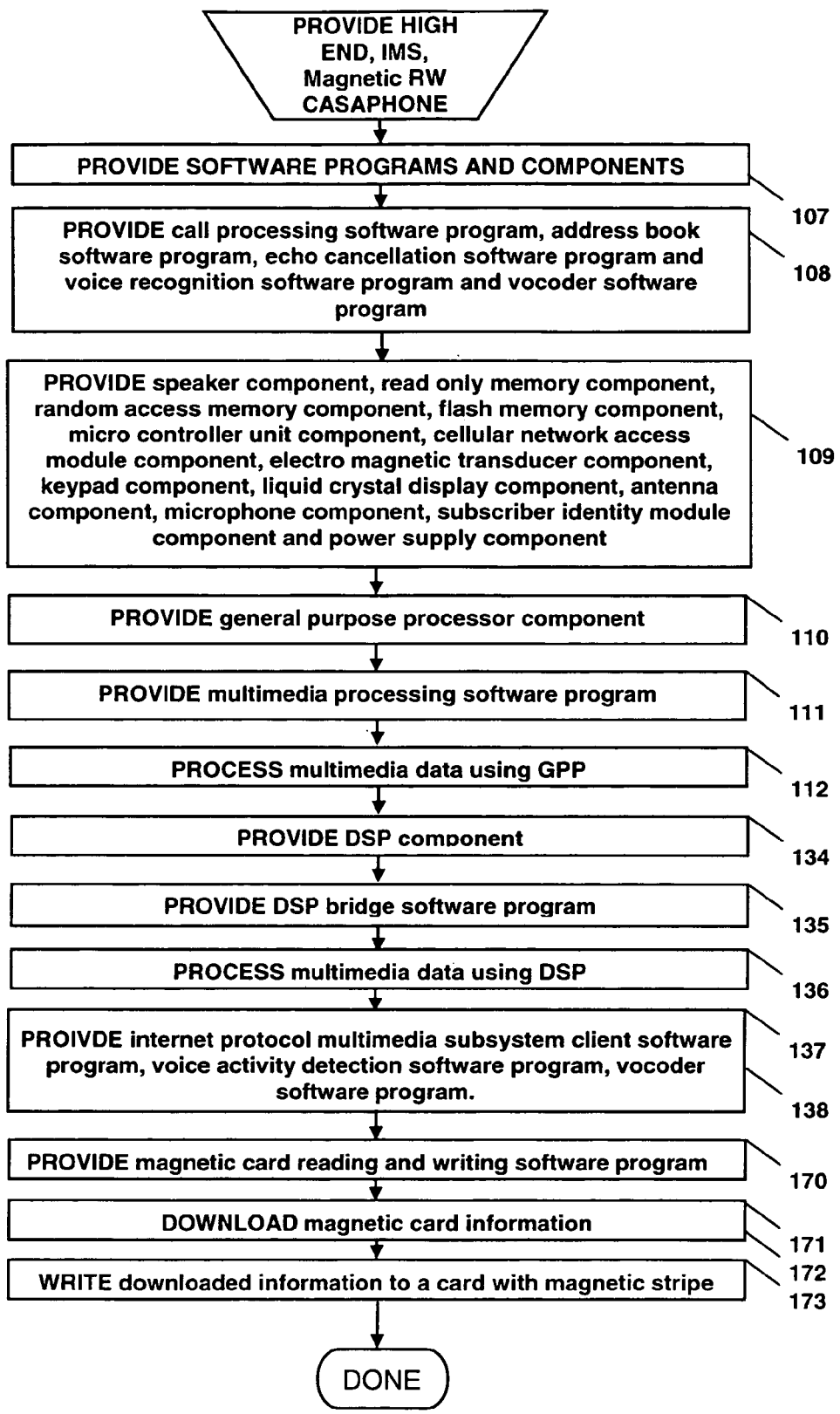
FIG. 46 shows a flow chart of method combining high end phone, internet protocol multimedia subsystem client software program and magnetic card reading and writing software program in accordance with claim 40 of present invention.

FIG. 46 shows a flow chart of method to provide a hands free cellular phone system using high end, IMS and magnetic card reading and writing software program enabled casaphone 82 in accordance with claim 40 of present invention. High end, IMS and magnetic card reading and writing software program enabled casaphone 82 is an extension to high end IMS enabled casaphone 55. High end, IMS and magnetic card reading and writing software program enabled casaphone 82 is used to enable time and transaction limited encoding of magnetic stripes 84. In step 170 magnetic card reading and writing software program 83 is provided. In step 171 downloading of magnetic card information 172 using cellular network 27 and internet protocol multimedia subsystem client software program 56 is done.

In step 173 downloaded magnetic card information 172 is written to a conventional magnetic card 85 using magnetic card reading and writing software program 83 and general purpose processor component 6 and electromagnetic transducer component 28 of high end, IMS and magnetic card reading and writing software program enabled casaphone 82.

Advantages

From the description above a number of advantages of said hands free cellular phone system based on casaphone become evident:

a) A full featured wireless hands free cellular phone system utilizing conventional audio cassette player is provided without any wires hanging out.

b) High quality interactive multimedia applications are delivered utilizing conventional audio cassette player.

c) A forward compatible hands free cellular phone system utilizing conventional audio cassette player is provided that can adapt to any new data format limited only by system resources and not evolving data formats.

d) A forward compatible hands free cellular phone system utilizing conventional audio cassette player is provided that can adapt to any new application and is not limited by wireless accessory profiles.

e) A hands free cellular phone system utilizing conventional audio cassette player is provided that has highly efficient battery performance even with high data rate applications.

f) A hands free cellular phone system utilizing conventional audio cassette player is provided that is inexpensive to install.

g) A hands free cellular phone system utilizing conventional audio cassette player is provided that does not suffer from ever increasing costs associated with functionality upgrade of accessory.

Conclusion, Ramifications and Scope

Accordingly, the reader will see that combining a full featured cellular phone with a form factor of a conventional audio cassette provides a hands free cellular phone system that is full featured, cost efficient, battery efficient, and forward compatible to enable mass market adoption.

Although the description above contains much specificity, these should not be construed as limiting the scope of invention but merely as providing illustrations of some of the presently preferred embodiments of this invention. Thus the scope of this invention should be determined by appended claims and their legal equivalents, rather than by given examples.

We claim:

1. A cellular phone device, in form factor of a conventional audio cassette, coupled to conventional audio cassette player, comprising:
   a) Call processing software program, to enable making and receiving cellular phone calls,
   b) Cellular access module component to enable cellular network access for data and voice connectivity,
   c) Electromagnetic transducer component to enable said coupling between said cellular phone device and said conventional audio cassette player,
   d) Microphone component to enable capturing of voice and audio,
   e) Power supply component to supply power to said components, and
   f) Casing for said form factor that enables insertion of said cellular phone device into cassette slot of said conventional audio cassette player to enable said coupling.

2. The cellular phone device of claim 1, further comprising:
   a) Address book software program, to enable storage of phone numbers and other related data,
   b) Voice recognition software program, to enable voice activated dialing,
   c) Echo cancellation software program, to prevent echoes from said speaker component and speakers associated with said conventional audio cassette player,
   d) Vocoder software program, to encode and decode voice samples,
   e) Micro controller unit component to execute said software programs,
   f) Speaker component, that is optionally used when conventional audio cassette player is decoupled from said cellular phone device,
   g) Read only memory component to store permanent data and code associated with said software programs,
   h) Random access memory component to store temporary data associated with said software programs,
   i) Flash memory to store changeable data and software programs,
   j) Keypad component to enable manual operation of said cellular phone device,
   k) Liquid crystal display component to enable display of output from said software programs,
   l) Antenna component to connect said cellular access module component to said cellular network,
   m) Subscriber identity module component to enable user authentication in said cellular network, and
   n) Printed circuit board to electronically interconnect said components.

3. The cellular phone device of claim 2, further comprising:
   a) General purpose processor component to execute general purpose instructions and basic digital signal processing functions for voice and multimedia data processing, and
   b) Multimedia processing software program to enable multimedia data processing on said general purpose processor.

4. The cellular phone device of claim 3, further comprising:
   a) Digital image sensor module component to enable capturing of still and moving images to transfer to said cellular network.

5. The cellular phone device of claim 3, further comprising:
   a) Global positioning system component to enable location notification services.

6. The cellular phone device of claim 3, further comprising:
   a) Digital image sensor module component to enable capturing of still and moving images to transfer to said cellular network, and
   b) Global positioning system component to enable location notification applications.

7. The cellular phone device of claim 3, further comprising:
   a) Digital signal processor component to enable encoding and decoding of any data format for advanced voice and multimedia applications,
   b) Digital signal processor bridge hardware connectivity between said general purpose processor and said digital signal processor to enable exchange of data and instructions,
   c) Digital signal processor bridge protocol software program between said general purpose processor and said digital signal processor to enable exchange of data and instructions utilizing said digital signal processor bridge hardware connectivity.

8. The cellular phone device of claim 7, further comprising:
   a) Internet protocol multimedia subsystem client software program as specified by third generation partnership project and open mobile alliance standard bodies,
   b) Voice activity detection software program to detect presence of voice to enable interactive multimedia applications over internet protocol, and
   c) Vocoder software program to enable encoding and decoding of voice samples in real time.

9. The cellular phone device of claim 8, further comprising:
   a) Global positioning system component to enable location based services and navigation capabilities.

10. The cellular phone device of claim 9, further comprising:
    a) Digital image sensor module component to enable capturing of still and moving images to transfer to said cellular network.

11. The cellular phone device of claim 9, further comprising:
    a) Audio level control software program to enable automatic controlling of volume levels of audio output from said device based on driving conditions.

12. The cellular phone device of claim 8, further comprising:
    a) Interactive talk back software program to enable conversation to a group of participants with common interest in commercial broadcast audio content using said internet protocol multimedia subsystem client software program and broadcast time based group setting method.

13. The cellular phone device of claim 12, further comprising:
    a) Wireless audio broadcast receiver component to receive audio content using commercial broadcast radio channels, and
    b) Synchronization software program to automatically create dynamic chat groups based on audio content that is received in said wireless audio broadcast receiver component.

14. The cellular phone device of claim 13, wherein said wireless audio broadcast receiver component is selected from group consisting of digital radio broadcast receiver and amplitude modulation broadcast receiver and frequency modulation broadcast receiver and satellite radio broadcast receiver.

15. The cellular phone device of claim 8, further comprising:
    a) Codec download software program to enable downloading of audio codecs to enable decoding audio data formats using a combination of said general purpose processor and said digital signal processor.

16. The cellular phone device of claim 8, further comprising:
   a) Text to speech conversion software program to enable conversion of downloaded text to voice in real time.

17. The cellular phone device of claim 16, further comprising:
   a) Speech to text conversion software program to enable conversion of voice to text in real time.

18. The cellular phone device of claim 8, further comprising:
   a) Speech to text conversion software program to enable conversion of voice to text in real time.

19. The cellular phone device of claim 8, further comprising:
   a) Magnetic card reading and writing software program to encode and decode magnetic stripe content on conventional magnetic stripe based cards.

20. The cellular phone device of claim 18, wherein said magnetic stripe based card is selected from group consisting of bank card and credit card and debit card and automated tell machine card and library card and hotel card and access card.

21. The cellular phone device of claim 2, wherein said subscriber identity module component is selected from group consisting of detachable subscriber identity chip and embedded subscriber identity information.

22. The cellular phone device of claim 2, wherein said power supply component is selected from group consisting of nickel cadmium battery and lithium ion battery and lithium polymer battery and nickel metal hydride battery and fuel cell battery 23. A method to provide a hands free cellular phone system, said method, comprising:
   a) Providing a cellular phone device in form factor of a conventional audio cassette, said cellular phone device comprising operatively coupled software programs and components, said components assembled together on at least one printed circuit board such that assembly of components and printed circuit board can fit into a said form factor that enables insertion of said cellular device into a conventional audio cassette player,
   b) Providing call processing software program, and
   c) Providing micro controller unit component, cellular network access module component, electromagnetic transducer component, microphone component, and power supply component.

24. The method to provide a hands free cellular phone system of claim 23, further comprising:
   a) Providing call processing software program, address book software program, echo cancellation software program and voice recognition software program and vocoder software program, and
   b) Providing speaker component, read only memory component, random access memory component, flash memory component, keypad component, liquid crystal display component, antenna component, subscriber identity module component 25. The method to provide a hands free cellular phone system of claim 24, further comprising:
   a) Providing general purpose processor component,
   b) Providing multimedia processing software program to execute general purpose instructions and basic digital signal processing functions for multimedia processing, and
   c) Processing multimedia data using said multimedia processing software program and said general purpose processor component to decode multimedia messages.

26. The method to provide a hands free cellular phone system of claim 25, further comprising:
   a) Providing digital image sensor module component to enable capturing of still and moving images to transfer to said cellular network,
   b) Setting said cellular phone device in surveillance state,
   c) Capturing still and moving images in response to image capture event selected from group consisting of user initiated image capture event and audio activity detection triggered image capture event and contiguous image change detection triggered image capture event, and
   d) Sending said captured images to said cellular network.

27. The method to provide a hands free cellular phone system of claim 25, further comprising:
   a) Providing global positioning system component to enable location notification services,
   b) Setting said cellular phone device in surveillance state,
   c) Capturing location information using said global positioning system component in response to location capture event selected from group consisting of user initiated location capture event and audio activity detection triggered location capture event and contiguous image change detection triggered location capture event, and
   d) Sending said captured location information to said cellular network.

28. The method to provide a hands free cellular phone system of claim 25, further comprising:
   a) Providing digital image sensor module component and global positioning system component,
   b) Setting said cellular phone device in surveillance state,
   c) Capturing still and moving images in response to image capture event selected from group consisting of user initiated image capture event and audio activity detection triggered image capture event and contiguous image change detection triggered image capture event,
   d) Capturing location information using said global positioning system component in response to location capture event selected from group consisting of user initiated location capture event and audio activity detection triggered location capture event and contiguous image change detection triggered location capture event,
   e) Sending said captured images to said cellular network, and
   f) Sending said captured location information to said cellular network.

29. The method to provide a hands free cellular phone system of claim 25, further comprising:
   a) Providing digital signal processor component and digital signal processor bridge hardware connectivity,
   b) Providing digital signal processor bridge protocol software program, and
   c) Processing multimedia data using said multimedia processing software program, said general purpose processor component and said digital signal processor component 30. The method to provide a hands free cellular phone system of claim 29, further comprising:
   a) Providing internet protocol multimedia subsystem client software program as specified by third generation partnership project and open mobile alliance standard bodies and voice activity detection software program to detect presence of voice to enable interactive multimedia applications over internet protocol and vocoder software program to enable encoding and decoding of voice samples in real time.

31. The method to provide a hands free cellular phone system of claim 30, further comprising:
   a) Providing global positioning system component to enable location based services and navigation capabilities.

32. The method to provide a hands free cellular phone system of claim 31, further comprising:
   a) Providing digital image sensor module component to enable capturing of still and moving images to transfer to said cellular network.

33. The method to provide a hands free cellular phone system of claim 31, further comprising:
   a) Providing audio level control software program to enable automatic controlling of volume levels of audio output from said device based on driving conditions,
   b) Using location information from said global positioning system component to identify unfavorable traffic conditions, and
   c) Adjusting audio levels output into said conventional audio cassette player based on said unfavorable traffic conditions.

34. The method to provide a hands free cellular phone system of claim 30, further comprising:
   a) Providing interactive talk back software program to enable conversation to a group of participants with common interest in commercial broadcast audio content using said internet protocol multimedia subsystem software program,
   b) Setting up internet protocol multimedia subsystem group communication channels based on audio content and time of broadcast, and
   c) Enabling group communication between users listening to common broadcast audio content using said group communication channel.

35. The method to provide a hands free cellular phone system of claim 34, further comprising:
   a) Providing wireless audio broadcast receiver component to receive audio content using commercial broadcast radio channels,
   b) Providing synchronization software program to automatically create dynamic chat groups based on audio content that is received in said wireless audio broadcast receiver component,
   c) Setting up internet protocol multimedia subsystem group communication channels using said synchronization software program that derives grouping information from said wireless audio broadcast receiver component and corresponding audio content, and
   d) Enabling group communication between users listening to common broadcast audio content using said group communication channel.

36. The method to provide a hands free cellular phone system of claim 34, wherein said wireless audio broadcast receiver component is selected from group consisting of digital radio broadcast receiver and amplitude modulation broadcast receiver and frequency modulation broadcast receiver and satellite radio broadcast receiver.

37. The method to provide a hands free cellular phone system of claim 30, further comprising:
   a) Providing codec download software program to enable downloading of audio codecs to enable decoding audio data formats using a combination of said general purpose processor and said digital signal processor,
   b) Downloading said audio codecs to said cellular phone device using said codec download software program,
   c) Downloading audio content corresponding to said audio codecs into said cellular phone device using said internet protocol multimedia subsystem client software program, and
   d) Decoding said audio content using said audio codecs said digital signal processor and said general purpose processor and playing out decoded audio content through audio output component selected from group consisting of said speaker component in said cellular phone device and said electromagnetic transducer in said cellular phone device.

38. The method to provide a hands free cellular phone system of claim 30, further comprising:
   a) Providing text to speech conversion software program to enable conversion of downloaded text to voice in real time,
   b) Downloading text based content using said internet protocol multimedia subsystem client software program, and
   c) Converting said text based content into generated audio content using said text to speech conversion software program, said digital signal processor and said general purpose processor and playing out said generated audio content through audio output component selected from group consisting of said speaker component in said cellular phone device and said electromagnetic transducer in said cellular phone device.

39. The method to provide a hands free cellular phone system of claim 38, further comprising:
   a) Providing speech to text conversion software program to enable conversion of voice to text in real time,
   b) Recording speech originating from said microphone of said cellular phone device, and
   c) Converting said recorded speech content into generated text content using said speech to text conversion software program, said digital signal processor and said general purpose processor and initiating transfer of said generated text content into said cellular network using internet protocol multimedia subsystem client software program.

40. The method to provide a hands free cellular phone system of claim 30, further comprising:
   a) Providing speech to text conversion software program to enable conversion of voice to text in real time,
   b) Recording speech originating from said microphone of said cellular phone device, and
   c) Converting said recorded speech content into generated text content using said speech to text conversion software program, said digital signal processor and said general purpose processor and initiating transfer of said generated text content into said cellular network using internet protocol multimedia subsystem client software program.

41. The method to provide a hands free cellular phone system of claim 30, further comprising:
   a) Providing magnetic card reading and writing software program to encode and decode magnetic stripe content on conventional magnetic stripe based cards,
   b) Downloading magnetic card information using said cellular network and said internet protocol multimedia subsystem client software program, and
   c) Writing said downloaded magnetic card information to a card with magnetic stripe using said magnetic card reading and writing software program and said general purpose processor and said electromagnetic transducer of said cellular phone device.

42. The method to provide a hands free cellular phone system of claim 41, wherein said magnetic stripe based card is selected from group consisting of bank card and credit card and debit card and automated tell machine card and library card and hotel card and access card 43. The method to provide a hands free cellular phone system of claim 24, wherein said subscriber identity module component is selected from group consisting of detachable subscriber identity chip and embedded subscriber identity information 44. The method to provide a hands free cellular phone system of claim 24, wherein said power supply component is selected from group consisting of nickel cadmium battery and lithium ion battery and lithium polymer battery and nickel metal hydride battery and fuel cell battery.

* * * * *